United States Patent
Shrestha et al.

(10) Patent No.: US 12,335,750 B2
(45) Date of Patent: Jun. 17, 2025

(54) METHODS OF MANAGING COMMUNICATION BASED ON INFORMATION DEFINING AN OPERATIONAL ENVIRONMENT AND RELATED NODES

(71) Applicant: Telefonaktiebolaget LM Ericsson (publ), Stockholm (SE)

(72) Inventors: Deep Shrestha, Linköping (SE); Sara Modarres Razavi, Stockholm (SE); Ritesh Shreevastav, Upplands Väsby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 386 days.

(21) Appl. No.: 17/792,725

(22) PCT Filed: Jan. 14, 2020

(86) PCT No.: PCT/IB2020/050272
§ 371 (c)(1),
(2) Date: Jul. 14, 2022

(87) PCT Pub. No.: WO2021/144607
PCT Pub. Date: Jul. 22, 2021

(65) Prior Publication Data
US 2023/0057057 A1    Feb. 23, 2023

(51) Int. Cl.
*H04W 16/28* (2009.01)
*H04W 24/02* (2009.01)
(Continued)

(52) U.S. Cl.
CPC ............ *H04W 16/28* (2013.01); *H04W 24/02* (2013.01); *H04W 36/085* (2023.05); *H04W 36/322* (2023.05)

(58) Field of Classification Search
CPC ... H04W 16/28; H04W 24/02; H04W 36/085; H04W 36/322; H04W 36/06;
(Continued)

(56) References Cited

U.S. PATENT DOCUMENTS 9,967,753 B1 * 5/2018 Jadunandan ............ H04W 4/24
2008/0247450 A1 * 10/2008 Alexander .......... H04L 25/0204
375/354
(Continued)

OTHER PUBLICATIONS

International Search Report and Written Opinion of the International Searching Authority, PCT/IB2020/050272, mailed Aug. 6, 2020, 14 pages.
(Continued)

*Primary Examiner* — Don N Vo
(74) *Attorney, Agent, or Firm* — Sage Patent Group

(57) ABSTRACT

Methods may be provided to operate a Radio Access Network RAN node of a wireless communication network. Information defining an operational environment in which a wireless device is operating may be obtained. Communication with the wireless device may be managed based on the information defining the operational environment in which the wireless device is operating. Related RAN nodes, computer programs, and computer program products are also discussed.

20 Claims, 28 Drawing Sheets

(51) Int. Cl.
*H04W 36/08* (2009.01)
*H04W 36/32* (2009.01)

(58) Field of Classification Search
CPC . H04W 36/0085; H04W 76/20; H04W 64/00;
H04W 24/10; H04L 5/001; H04B 7/0695;
H04B 7/088
USPC .......................................................... 455/446
See application file for complete search history.

(56) References Cited

U.S. PATENT DOCUMENTS

| | | | |
|---|---|---|---|
| 2013/0237245 A1 | 9/2013 | Tinnakornsrisuphap | |
| 2014/0114568 A1* | 4/2014 | Park | G01S 19/48 701/469 |
| 2014/0148173 A1 | 5/2014 | Karaoguz | |
| 2015/0257118 A1* | 9/2015 | Siomina | G01S 5/021 455/456.1 |
| 2018/0091196 A1* | 3/2018 | Frenne | H04L 5/005 |
| 2018/0176801 A1* | 6/2018 | Rune | H04B 7/0695 |
| 2018/0219659 A1* | 8/2018 | Wernersson | H04B 7/0626 |
| 2018/0323844 A1* | 11/2018 | Baldemair | H04L 27/2605 |
| 2018/0352453 A1* | 12/2018 | Gunnarsson | H04W 76/10 |
| 2020/0396744 A1* | 12/2020 | Xiong | H04B 7/088 |
| 2022/0078801 A1* | 3/2022 | Huang | H04W 24/10 |

OTHER PUBLICATIONS

Ericsson, "RAT independent and hybrid NR positioning solutions", vol. RAN WG2, No. Athens, Greece; Feb. 15, 2019, 3GPP Draft; R2-1901531 (XP051602889) 6 pages.

Ericsson, "Discussion on Use cases for Location Aware Functionality in RAN", vol. RAN WG2, No. Athens, Greece; Feb. 15, 2019, 3GPP Draft; R2-1901534 (XP051602892) 4 pages.

Reynaud S et al, "Outdoor to Indoor Channel Characterization by Simulations and Measurements for Optimizing WiMAX Relay Network Deployment", 2009 IEEE 69th Vehicular Technology Conference; Apr. 26-29, 2009, Barcelona, Spain (XP031474709) 6 pages.

Santana J., et al., "Empirically based study of channel characteristics with near-ground base-stations", 2015 IEEE Wireless Communications and Networking Conference (WCNC), IEEE, Mar. 9, 2015 (XP032786474) 6 pages.

Jia et al., "An Indoor and Outdoor Seamless Positioning System Based on Android Platform", 2016 IEEE Trustcom/BigDatase/ISPA, Aug. 23, 2016 (XP033063446) 8 pages.

* cited by examiner

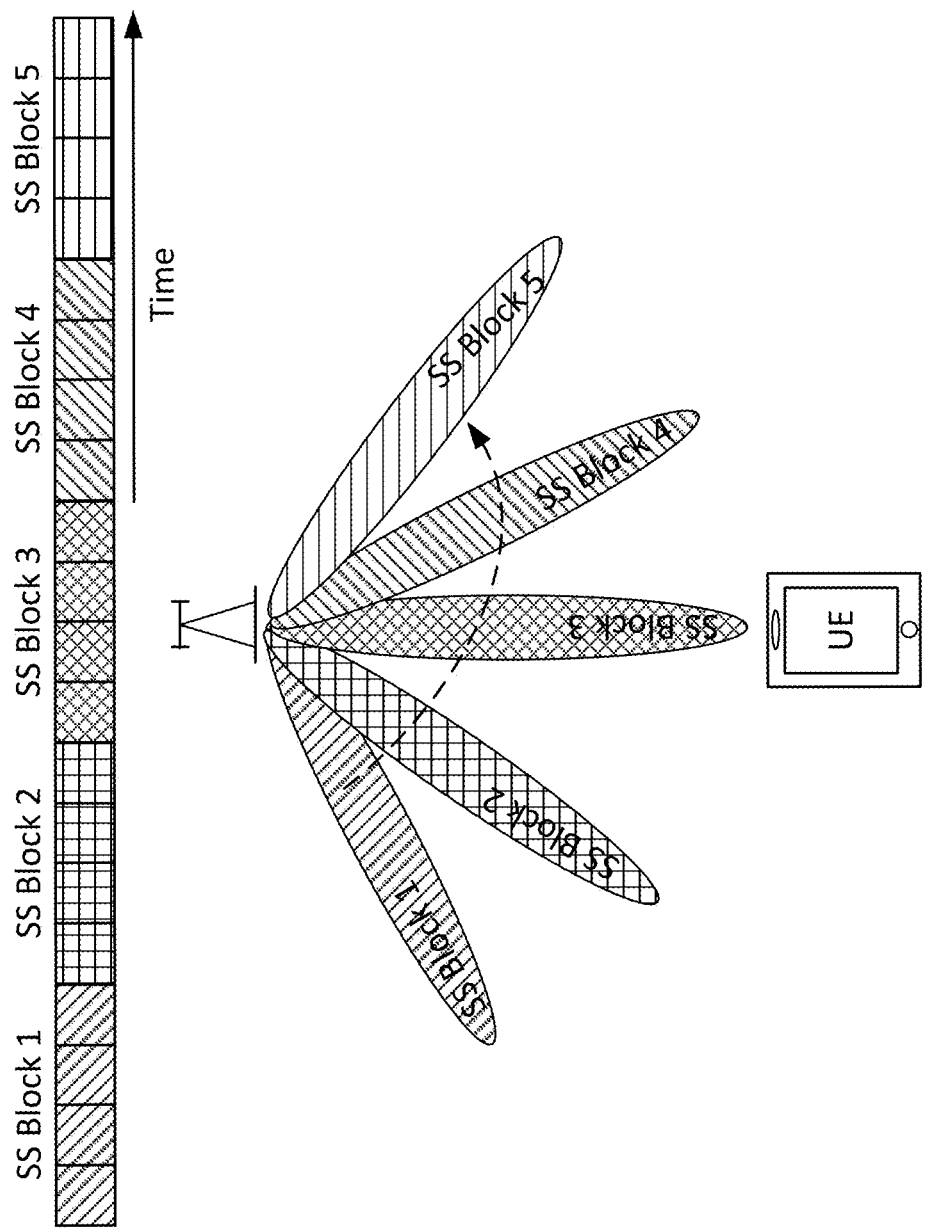

Figure 6

300 — Receive beam configuration update from the base station and keep it for future reference.

Figure 7

```
LocationSource-r13 ::= BIT STRING {  a-gnss              (0),
                                     wlan                (1),
                                     bt                  (2),
                                     tbs                 (3),
                                     sensor              (4),
                                     ha-gnss-v1510       (5),
                                     motion-sensor-v1550 (6) } (SIZE(1..16))
```

Power Delay Profile

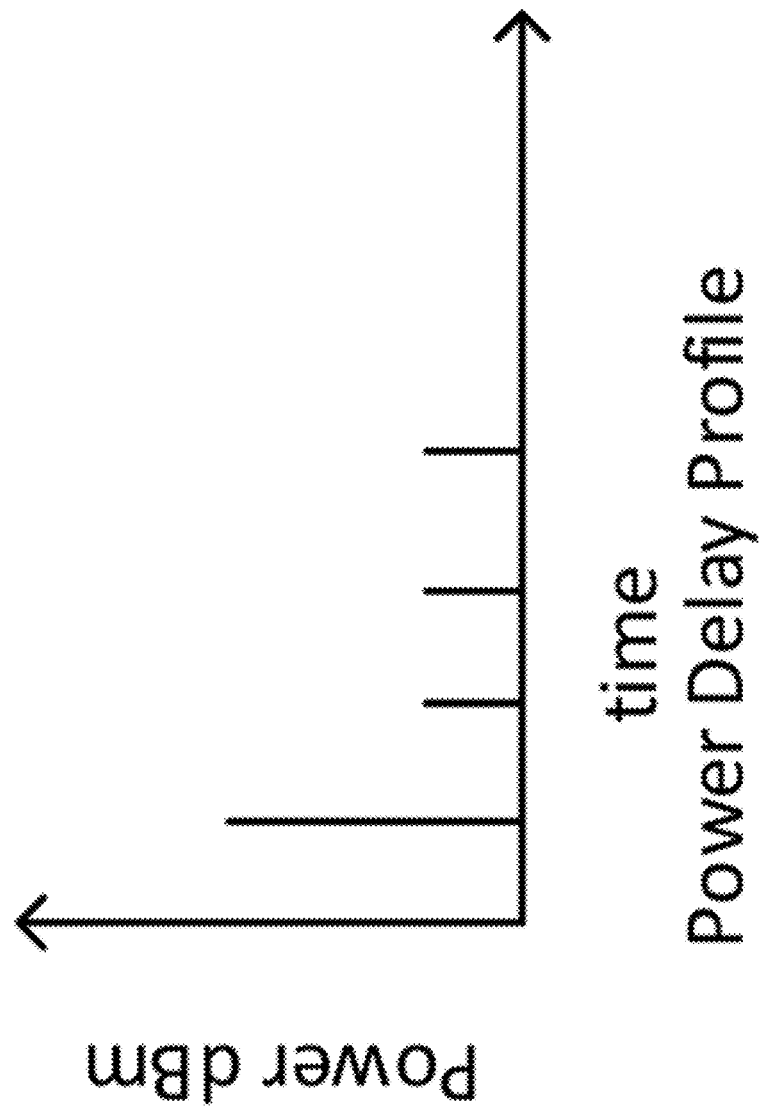

Figure 10A

| TX beam Index 1 | TX beam Index 2 | ... | TX beam Index K |
|---|---|---|---|
| RSRP | RSRP | ... | RSRP |
| Direction | Direction | ... | Direction |
| Beamwidth | Beamwidth | ... | Beamwidth |
| Power boosting | Power boosting | ... | Power boosting |
| Association Rule | Association Rule | ... | Association Rule |

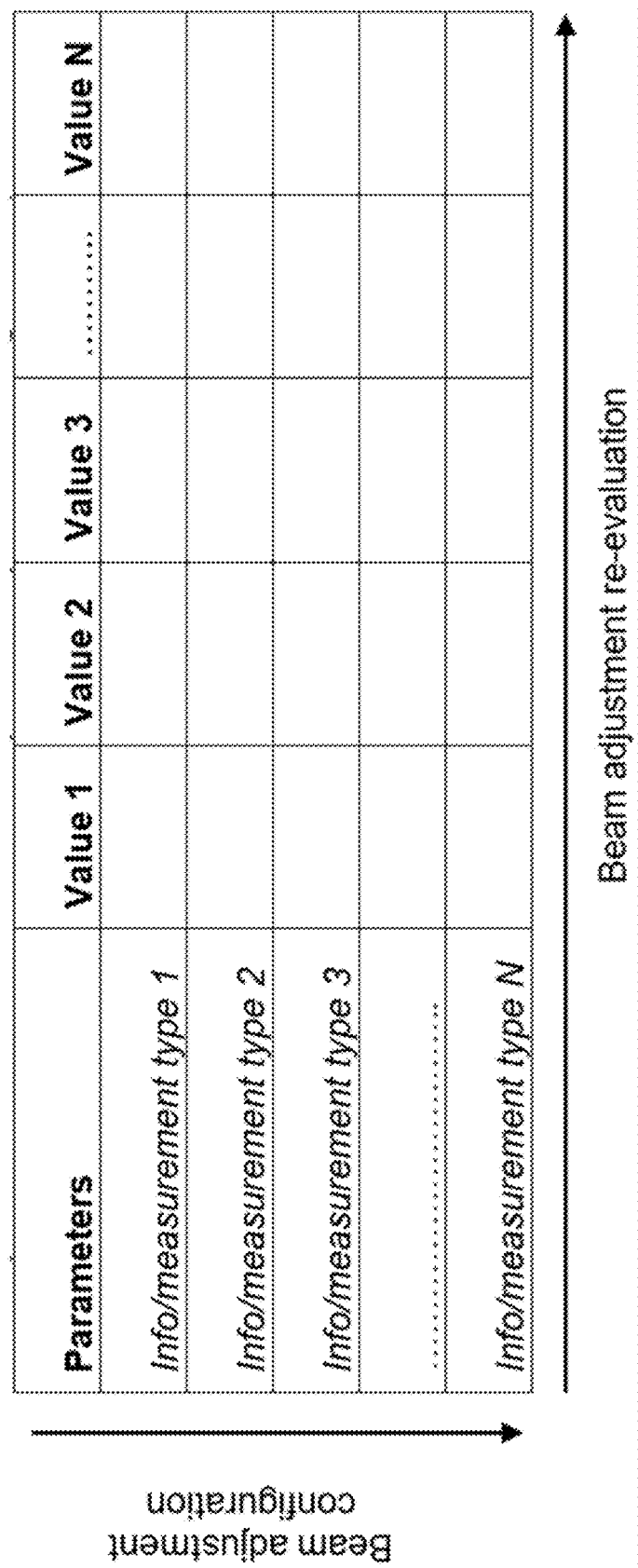

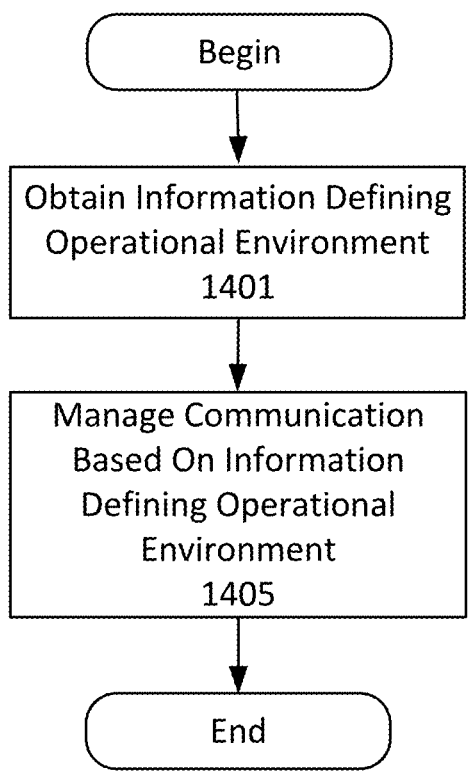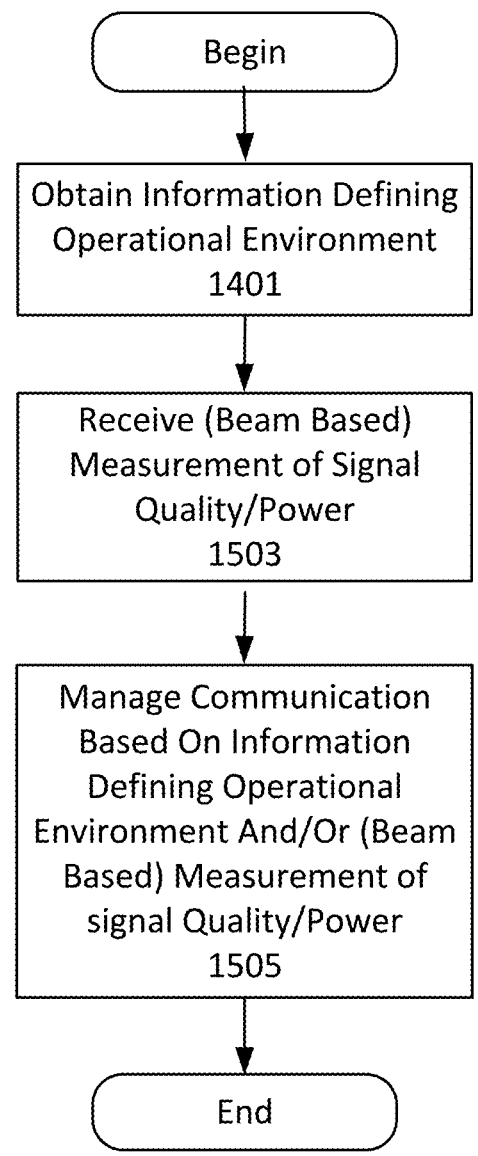

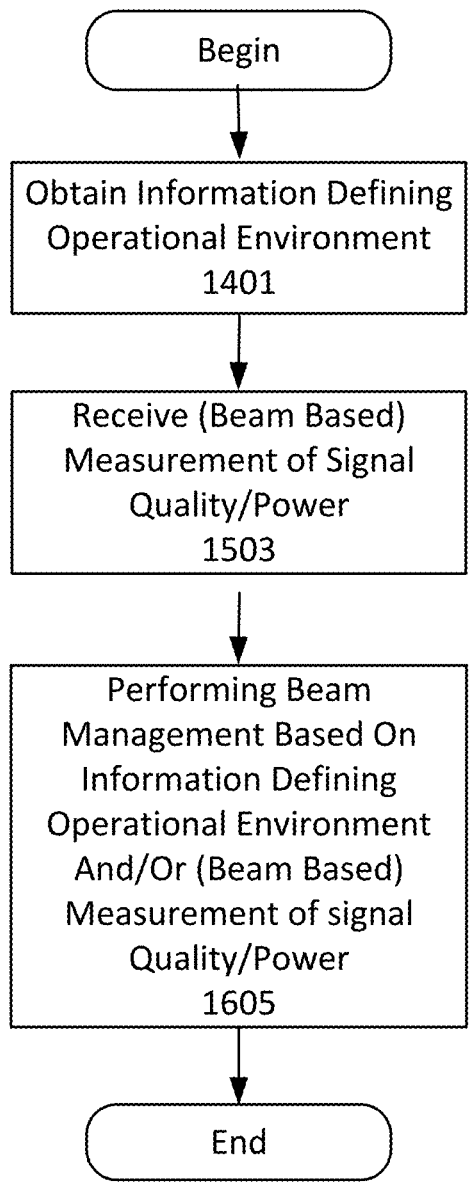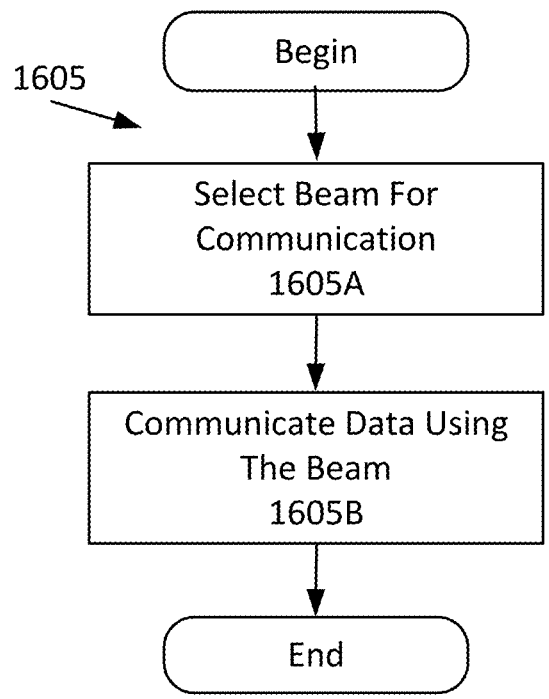

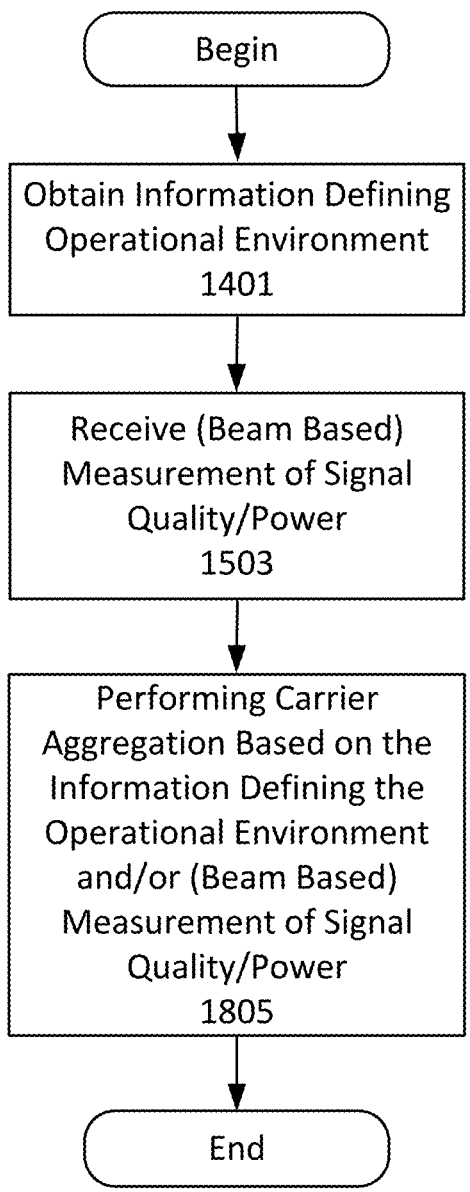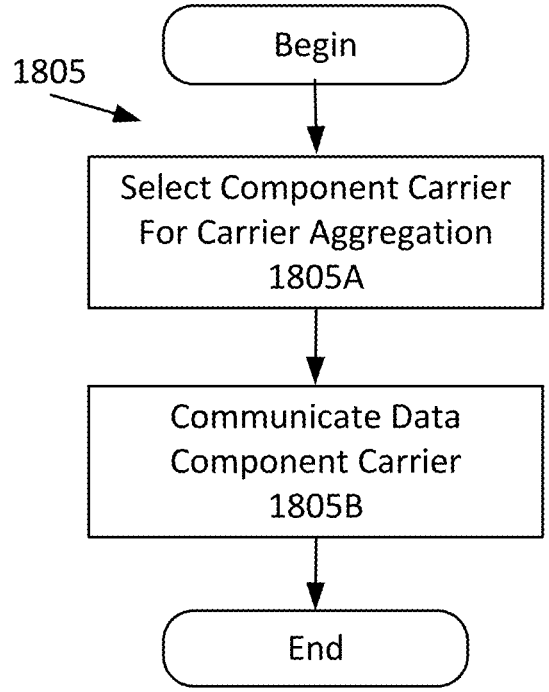

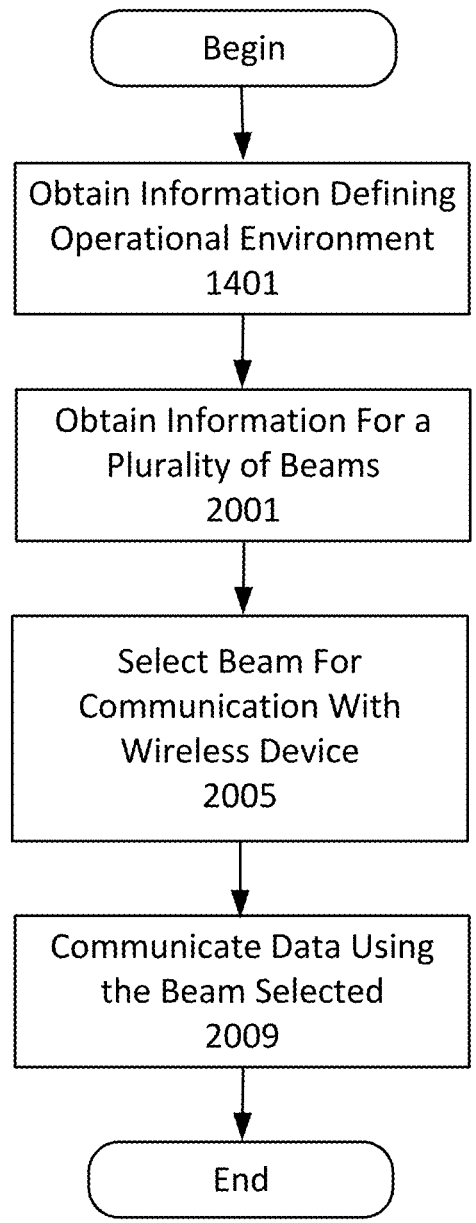

METHODS OF MANAGING COMMUNICATION BASED ON INFORMATION DEFINING AN OPERATIONAL ENVIRONMENT AND RELATED NODES

CROSS REFERENCE TO RELATED APPLICATIONS

This application is a 35 U.S.C. § 371 national stage application of PCT International Application No. PCT/IB2020/050272 filed on Jan. 14, 2020, the disclosure and content of which is incorporated by reference herein in its entirety.

TECHNICAL FIELD

The present disclosure relates generally to communications, and more particularly to communication methods and related devices and nodes supporting wireless communications.

BACKGROUND

To support increased traffic capacity and to enable the transmission bandwidth to support high data rate services, 5G will extend the range of frequencies used for mobile communication. This includes new spectrum below 6 GHz, as well as spectrum in higher frequency bands such as 28 GHz. High frequency bands may provide contiguous larger bandwidth for higher rates in data communication. In such high frequency bands, the radio links may be susceptible to rapid channel variations and may suffer from severe pathloss and atmospheric absorption. To address these challenges, the base stations and the mobile terminals in 5G will use highly directional antennas for beamforming to achieve sufficient link budget in a wide area network.

Depending upon the possibility of generating and projecting a number of beams, three different beamforming techniques can be used. These techniques include analog beamforming, hybrid beam forming, and digital beamforming, and these techniques are discussed below.

The analog beamforming approach shapes the beam through a signal Radio Frequency (RF) chain for all the antenna elements. The processing is done in the analog domain and it may only be possible to transmit/receive a beam in one direction at a time.

The hybrid beamforming approach may require RF chains equivalent to the number of beams to be formed. An N RF chain hybrid beamformer may thus produce N beams and may enable the transceiver to transmit/receive N analog beams in N simultaneous directions.

The digital beamforming (unlike hybrid and analog beamforming architectures) approach may require a separate RF chain and data converters for each antenna element and may allow processing of the received signals in the digital domain. Digital beamforming may potentially allow a transceiver to direct beams in infinite directions.

As the radio link signal is beamformed, the precision in the transmitter and the receiver beam alignment may have important implications with respect to initial access, handover and beam tracking procedures. Efficient beam management therefore has been a hot issue for improved/optimized 5G network operation and contains three-fold operations, including beam establishment, beam adjustment, and beam recovery. In the following discussion, brief elaboration of the three beam management operations is provided.

The beam establishment procedure includes operations of beam sweeping, beam measurements, beam determination, and beam reporting as discussed below.

A beam sweeping procedure is illustrated in FIG. 1. During beam sweeping, a geographical area is covered by a set of beams transmitted and received according to predefined intervals in time and direction in the Downlink (DL). As shown in FIG. 1, SS Block 1 (including 4 blocks) may be transmitted using a first beam in a first direction, SS Block 2 (including 4 blocks) may be transmitted using a second beam in a second direction (after the first beam), SS Block 3 (including 4 blocks) may be transmitted using a third beam in a third direction (after the second beam), SS Block 4 (including 4 blocks) may be transmitted using a fourth beam in a fourth direction (after the third beam), and SS Block 5 (including 4 blocks) may be transmitted using a fifth beam in a fifth direction (after the fourth beam).

The beam measurement procedure may be valid for both uplink UL and downlink DL transmission. During the beam measurement procedure, the quality of the received signal at the gNodeB (for UL) or at the UE (for DL) is evaluated. In DL, the User Equipment (UE) measures the beams from the gNodeB and analyses them based on received signal strength in each beam. A similar procedure is carried out at the gNodeB where the beam coming from the UE is measured for each beam.

During the beam determination procedure, a suitable beam is determined in the gNodeB and UE based on the beam measurements performed in the Downlink (DL) and in the Uplink (UL).

The beam reporting procedure is used by the UE to report the beam quality and the beam decision information to the radio access network.

A beam reporting procedure is illustrated in FIG. 2A. Beam adjustment is discussed below with respect to FIG. 2B (illustrating DownLink DL transmitter-side beam adjustment) and 2C (illustrating DL receiver-side beam adjustment). Once an initial beam pair has been established, there may be a need to regularly re-evaluate the selection of transmitter-side and receiver-side beam directions due to movement and/or rotation of the mobile device. The beam adjustment procedure may also include refining the beam shapes and includes re-evaluation of both transmitter side and receiver side beam adjustment. Conventionally UL/DL beam correspondence is considered so that beam adjustment done in either direction of transmission is also considered valid for the other direction of transmission. FIG. 2B illustrates Downlink DL transmitter-side (RAN node, also referred to as a base station, gNB, gNodeB, etc.) beam adjustment, and FIG. 2C illustrates DL receiver-side (UE) beam adjustment.

Beam Recovery is discussed below.

When a UE in connected mode experiences a poor channel condition, it receives a beam failure recovery indication from the lower layer entities. The UE then transmits a request for beam recovery to the gNodeB.

The beam management procedure may typically be handled via NR-Uu and LTE-Uu interfaces as shown in FIG. 3. Exploitation of the normative protocol may depend on the NR standalone or non-standalone deployment strategies. Beam management is illustrated in FIG. 3 with respect to NG-RAN Rel-15 LCS Protocols.

Current beam management procedures may less effective in some situations in non-line of sight communications, for example, if the UE is indoors and/or subject to a reflected signal path.

SUMMARY

According to some embodiments of inventive concepts, methods may be provided to operate a Radio Access Network RAN node of a wireless communication network. Information defining an operational environment in which a wireless device is operating may be obtained. Communication with the wireless device may be managed based on the information defining the operational environment in which the wireless device is operating.

By providing information defining the operational environment, the RAN node may be able to provide improved beam management, improved handover operations, and/or improved carrier aggregation.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 1 is a diagram illustrating beam sweeping procedures;

FIG. 6 is a flow chart illustrating a location server operation according to some embodiments;

FIG. 7 is a table an information element used to communicate a location information source according to some embodiments;

FIG. 9 is a diagram illustrating a power delay provide corresponding to line-of-sight LOS communication according to some embodiments;

FIG. 10A illustrates a table providing beam association information according to some embodiments;

FIG. 10B illustrates a table that may be used by a base station to identify beam adjustment configurations/parameters according to some embodiments;

FIGS. 14, 15, 16A, 16B, 17, 18A, 18B, 19A, 19B, and 20 are flow charts illustrating operations of a RAN node according to some embodiments of inventive concepts;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 11:
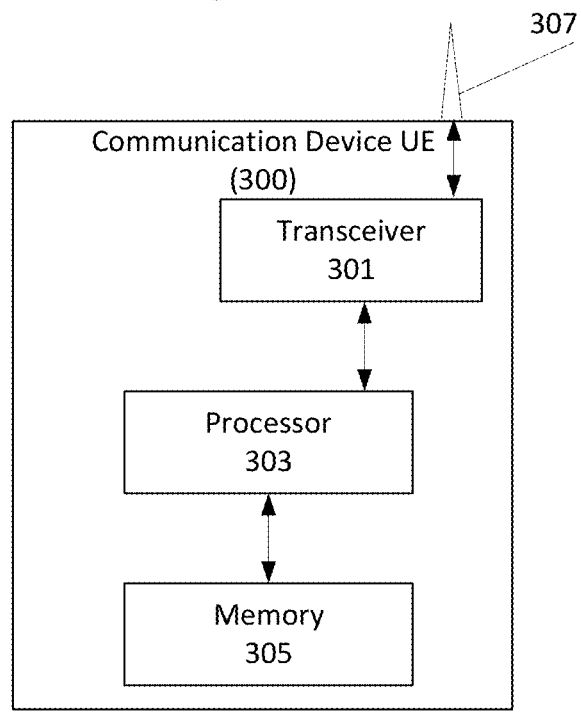
FIG. 11 is a block diagram illustrating a wireless communication device UE according to some embodiments of inventive concepts.

FIG. 11 is a block diagram illustrating elements of a wireless communication device UE 300 (also referred to as a mobile terminal, a mobile communication terminal, a wireless device, a wireless terminal, mobile device, a wireless communication terminal, user equipment, UE, a user equipment node/terminal/device, etc.) configured to provide wireless communication according to embodiments of inventive concepts. (Wireless device 300 may be provided, for example, as discussed below with respect to wireless device 4110 of FIG. 21.) As shown, wireless device UE may include an antenna 307 (e.g., corresponding to antenna 4111 of FIG. 21), and transceiver circuitry 301 (also referred to as a transceiver, e.g., corresponding to interface 4114 of FIG. 21) including a transmitter and a receiver configured to provide uplink and downlink radio communications with a base station(s) (e.g., corresponding to network node 4160 of FIG. 21, also referred to as a RAN node) of a radio access network. Wireless device UE may also include processing circuitry 303 (also referred to as a processor, e.g., corresponding to processing circuitry 4120 of FIG. 21) coupled to the transceiver circuitry, and memory circuitry 305 (also referred to as memory, e.g., corresponding to device readable medium 4130 of FIG. 21) coupled to the processing circuitry. The memory circuitry 305 may include computer readable program code that when executed by the processing circuitry 303 causes the processing circuitry to perform operations according to embodiments disclosed herein. According to other embodiments, processing circuitry 303 may be defined to include memory so that separate memory circuitry is not required. Wireless device UE may also include an interface (such as a user interface) coupled with processing circuitry 303, and/or wireless device UE may be incorporated in a vehicle.

As discussed herein, operations of wireless device UE may be performed by processing circuitry 303 and/or transceiver circuitry 301. For example, processing circuitry 303 may control transceiver circuitry 301 to transmit communications through transceiver circuitry 301 over a radio interface to a radio access network node (also referred to as a base station) and/or to receive communications through transceiver circuitry 301 from a RAN node over a radio interface. Moreover, modules may be stored in memory circuitry 305, and these modules may provide instructions so that when instructions of a module are executed by processing circuitry 303, processing circuitry 303 performs respective operations (e.g., operations discussed below with respect to Example Embodiments relating to wireless devices).

Figure 12:
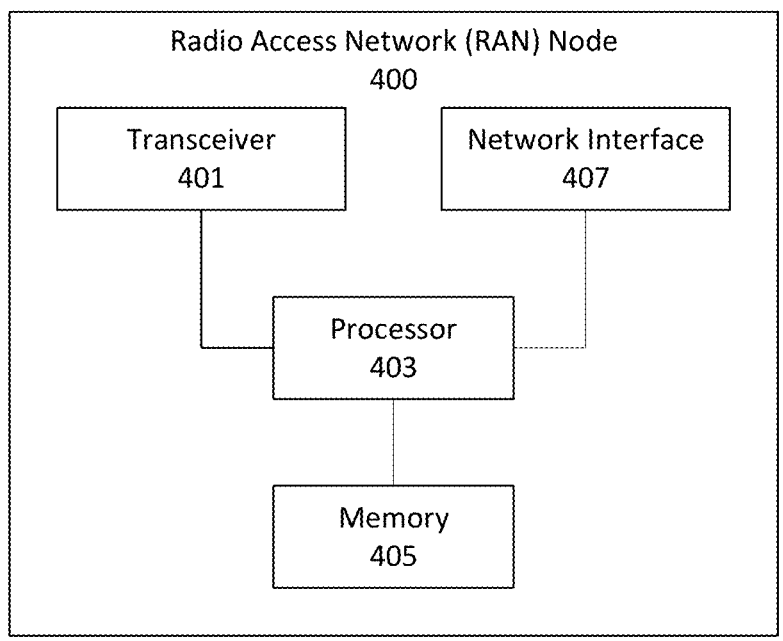
FIG. 12 is a block diagram illustrating a radio access network RAN node (e.g., a base station eNB/gNB) according to some embodiments of inventive concepts.

FIG. 12 is a block diagram illustrating elements of a radio access network RAN node 400 (also referred to as a network node, base station, eNodeB/eNB, gNodeB/gNB, etc.) of a Radio Access Network (RAN) configured to provide cellular communication according to embodiments of inventive concepts. (RAN node 400 may be provided, for example, as discussed below with respect to network node 4160 of FIG. 21.) As shown, the RAN node may include transceiver circuitry 401 (also referred to as a transceiver, e.g., corresponding to portions of interface 4190 of FIG. 21) including a transmitter and a receiver configured to provide uplink and downlink radio communications with mobile terminals. The RAN node may include network interface circuitry 407 (also referred to as a network interface, e.g., corresponding to portions of interface 4190 of FIG. 21) configured to provide communications with other nodes (e.g., with other base stations) of the RAN and/or core network CN. The network node may also include processing circuitry 403 (also referred to as a processor, e.g., corresponding to processing circuitry 4170) coupled to the transceiver circuitry, and memory circuitry 405 (also referred to as memory, e.g., corresponding to device readable medium 4180 of FIG. 21) coupled to the processing circuitry. The memory circuitry 405 may include computer readable program code that when executed by the processing circuitry 403 causes the processing circuitry to perform operations according to embodiments disclosed herein. According to other embodiments, processing circuitry 403 may be defined to include memory so that a separate memory circuitry is not required.

As discussed herein, operations of the RAN node may be performed by processing circuitry 403, network interface 407, and/or transceiver 401. For example, processing circuitry 403 may control transceiver 401 to transmit downlink communications through transceiver 401 over a radio interface to one or more mobile terminals UEs and/or to receive uplink communications through transceiver 401 from one or more mobile terminals UEs over a radio interface. Similarly, processing circuitry 403 may control network interface 407 to transmit communications through network interface 407 to one or more other network nodes and/or to receive communications through network interface from one or more other network nodes. Moreover, modules may be stored in memory 405, and these modules may provide instructions so that when instructions of a module are executed by processing circuitry 403, processing circuitry 403 performs respective operations (e.g., operations discussed below with respect to Example Embodiments relating to RAN nodes).

According to some other embodiments, a network node may be implemented as a core network CN node without a transceiver. In such embodiments, transmission to a wireless device UE may be initiated by the network node so that transmission to the wireless device is provided through a network node including a transceiver (e.g., through a base station or RAN node). According to embodiments where the network node is a RAN node including a transceiver, initiating transmission may include transmitting through the transceiver.

Figure 13:
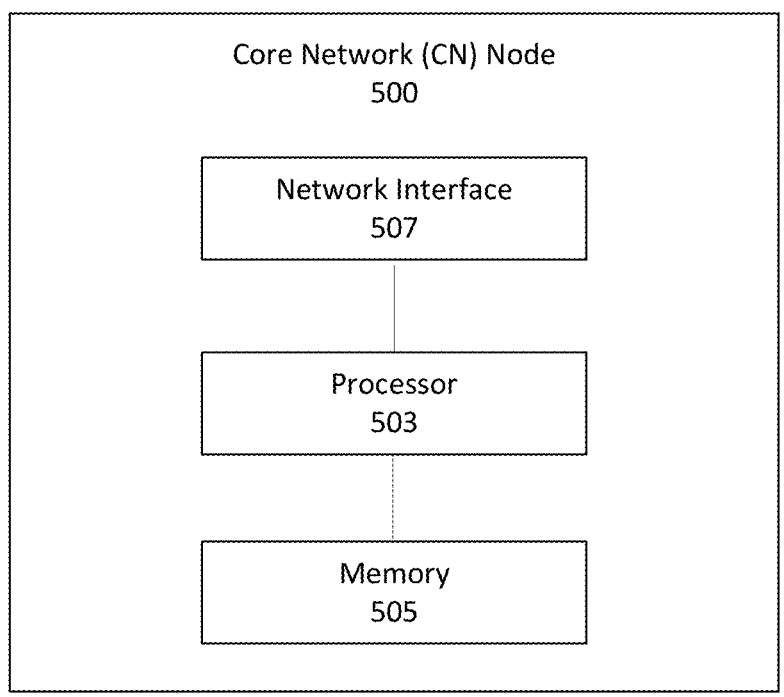
FIG. 13 is a block diagram illustrating a core network CN node (e.g., an AMF node, an SMF node, etc.) according to some embodiments of inventive concepts.

FIG. 13 is a block diagram illustrating elements of a core network CN node (e.g., an SMF node, an AMF node, etc.) of a communication network configured to provide cellular communication according to embodiments of inventive concepts. As shown, the CN node may include network interface circuitry 507 (also referred to as a network interface) configured to provide communications with other nodes of the core network and/or the radio access network RAN. The CN node may also include a processing circuitry 503 (also referred to as a processor) coupled to the network interface circuitry, and memory circuitry 505 (also referred to as memory) coupled to the processing circuitry. The memory circuitry 505 may include computer readable program code that when executed by the processing circuitry 503 causes the processing circuitry to perform operations according to embodiments disclosed herein. According to other embodiments, processing circuitry 503 may be defined to include memory so that a separate memory circuitry is not required.

As discussed herein, operations of the CN node may be performed by processing circuitry 503 and/or network interface circuitry 507. For example, processing circuitry 503 may control network interface circuitry 507 to transmit communications through network interface circuitry 507 to one or more other network nodes and/or to receive communications through network interface circuitry from one or more other network nodes. Moreover, modules may be stored in memory 505, and these modules may provide instructions so that when instructions of a module are executed by processing circuitry 503, processing circuitry 503 performs respective operations (e.g., operations discussed below with respect to Example Embodiments relating to core network nodes).

Beam management procedures and/or RRM procedures (such as mobility/handover) may currently rely on Reference Signal Received Power (RSRP) measurements on beams that convey a reference signal or a set of reference signals for beam measurement. As an enhancement, reference [1] (U.S. Pat. No. 6,512,481) uses the location of the UE as an input from the UE for beam adjustment. To adjust a beam, UE geo-location data based on Global Positioning (GPS) measurement may be used to compute an angle of arrival/departure and range of the radio signal. By using the determined angle of arrival/departure and range, the beamformer may then deterministically modify the radio signal beam projection from the Base Station (BS) to the UE and vice-versa. However, in a situation when a UE is indoors (or otherwise out of GPS coverage) the deterministic beam adjustment may not work. In addition, when the UE changes its location after reporting its geo-location data, the aforementioned beam adjustment protocol may be less effective. Therefore, in order to identify an improved/optimal beam projection for efficient beam management and/or to improve handovers, it may also be useful to incorporate side information of the environment and/or condition which the UE is experiencing at the time of beam.

According to some embodiments of the present disclosure, mechanisms may be provided to improve beam adjustment that can be useful for various RAN procedures.

Including the beam measurement (RSRP of a reference signal transmitted in beam for measurement), some embodiments of inventive concepts may also use on additional information reported by the UE to provide more efficient beam adjustment. Some embodiments of inventive concepts may be incorporated in both NR stand alone and NR non-standalone deployment strategies.

Figure 2A:
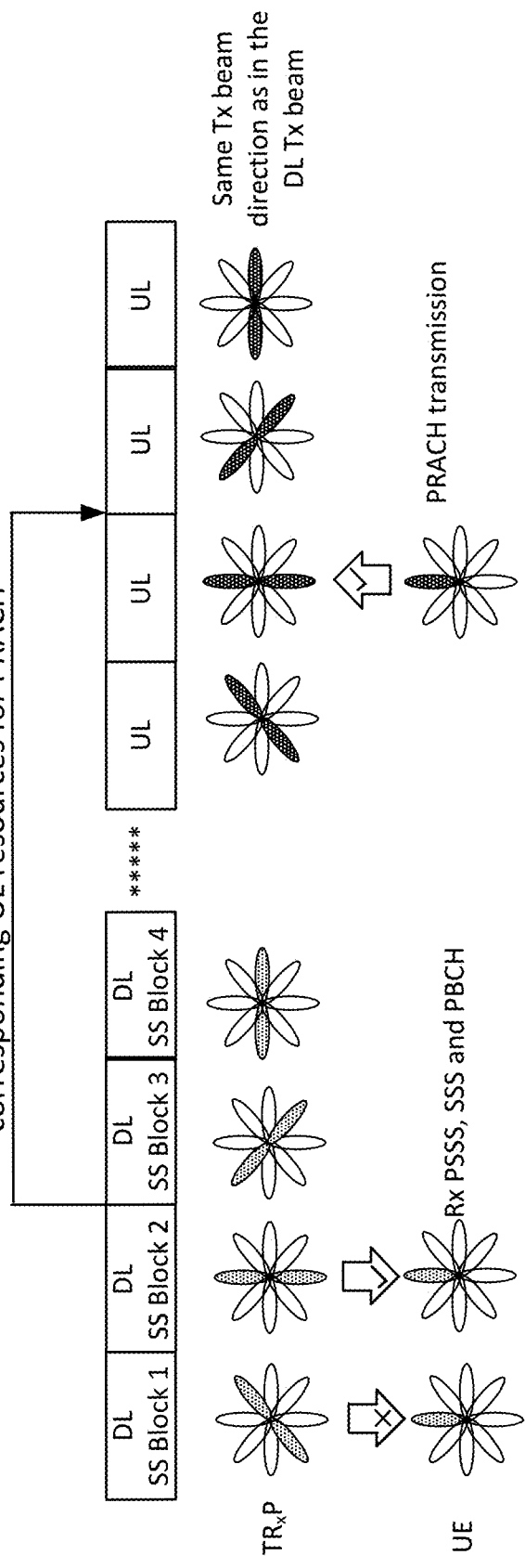
FIG. 2A is a diagram illustrating beam reporting/adjustment procedures.
Figure 2B:
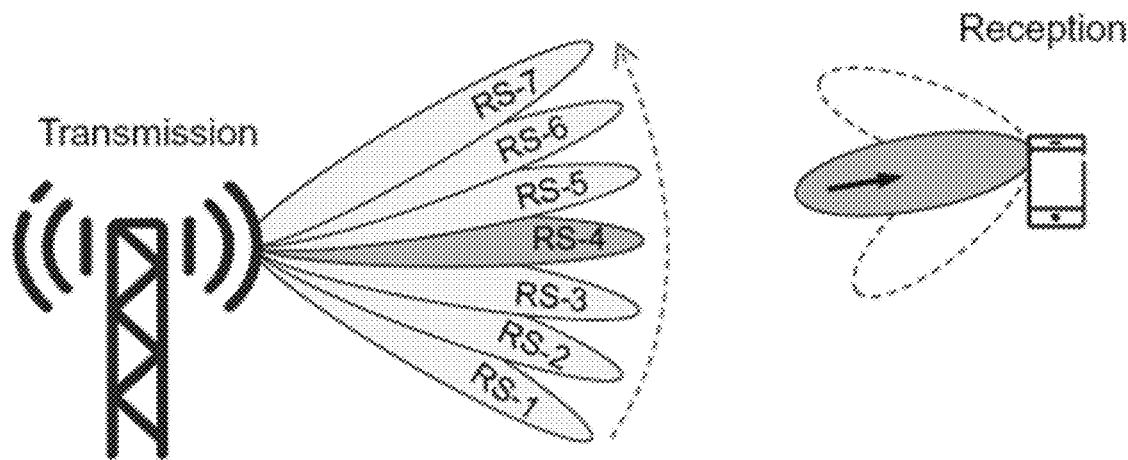
FIG. 2B is a diagram illustrating downlink transmitter-side beam adjustment.
Figure 2C:
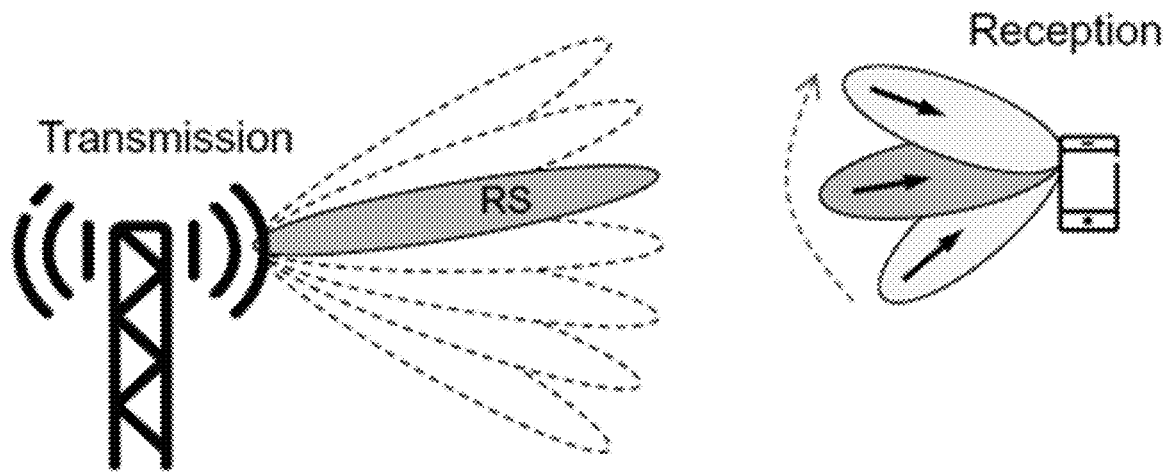
FIG. 2C is a diagram illustrating downlink receiver-side beam adjustment.
Figure 3:
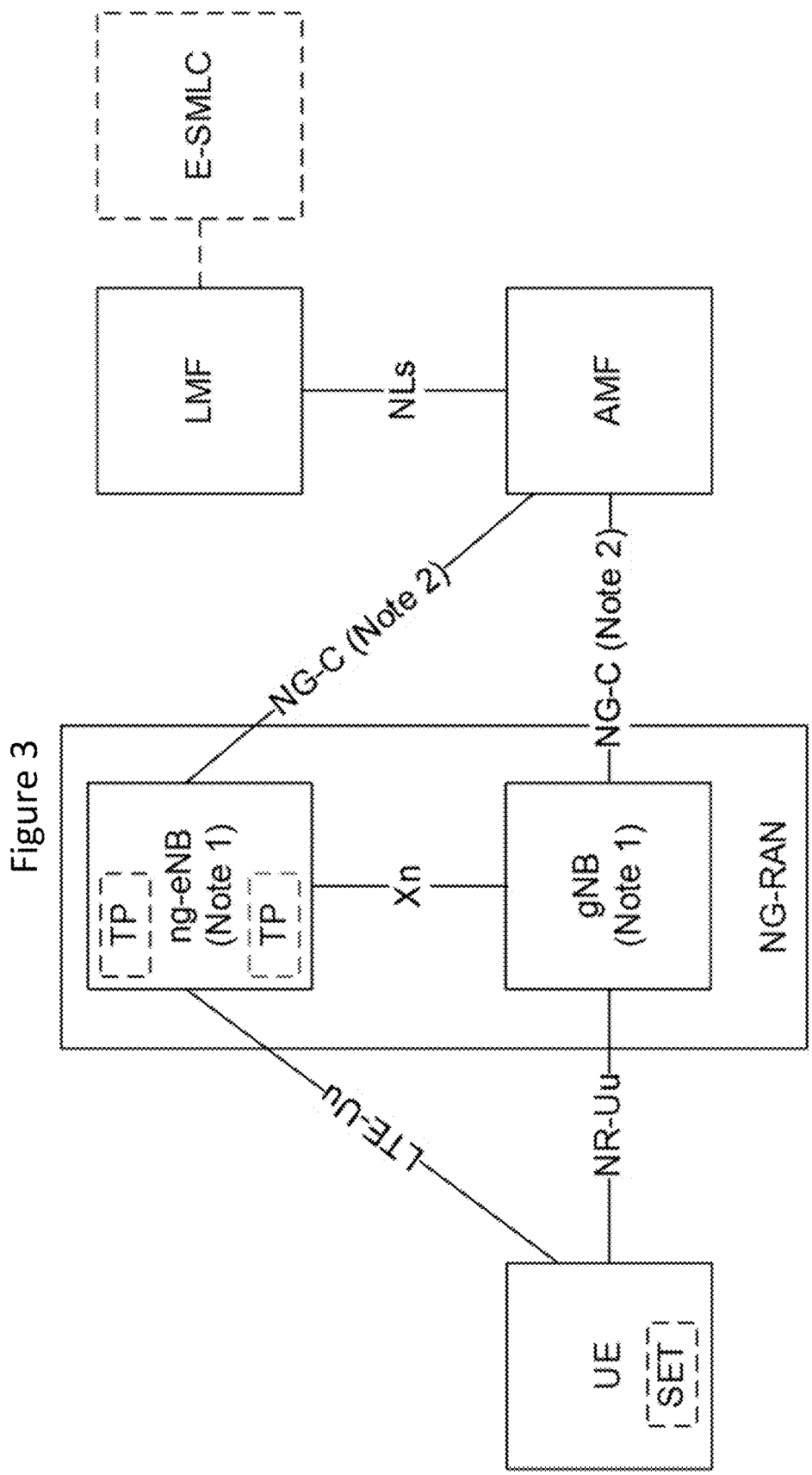
FIG. 3 is a block diagram illustrating NG-RAN Release 15 LCS protocols.
Figure 4:
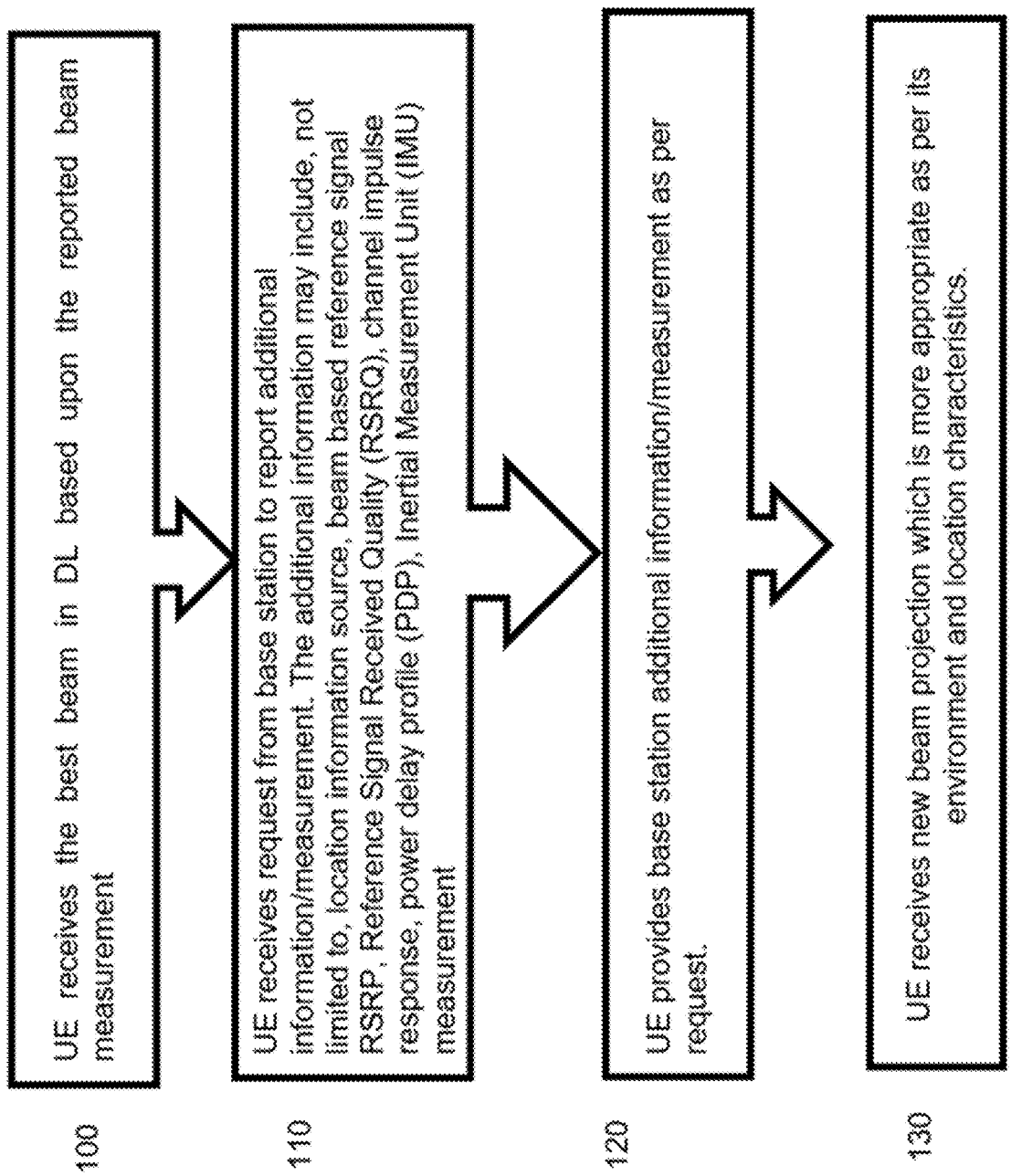
FIG. 4 is a flow chart illustrating UE operations according to some embodiments.

FIG. 4 is a flow chart illustrating UE operations according to some embodiments of inventive concepts. At operation 100, the UE may receive the best beam in DL based upon the reported beam measurement. At operation 110, the UE may receive a request from the base station to report additional information/measurement(s). The additional information/measurement(s) may include (but is not limited to) location information source, beam based reference signal RSRP, Reference Signal Received Quality (RSRQ), channel impulse response, power delay profile (PDP), inertial Measurement Unit (IMU)_measurement, sensor readings/measurements (such as barometric pressure sensor (altitude), light sensor (indoor/outdoor classification), etc. At operation 120, the UE may provide the base station with the additional information/measurement(s) as per the request. At operation 130, the UE may receive a new beam projection that is more accurate as per characteristics of its environment and/or location.

Figure 5:
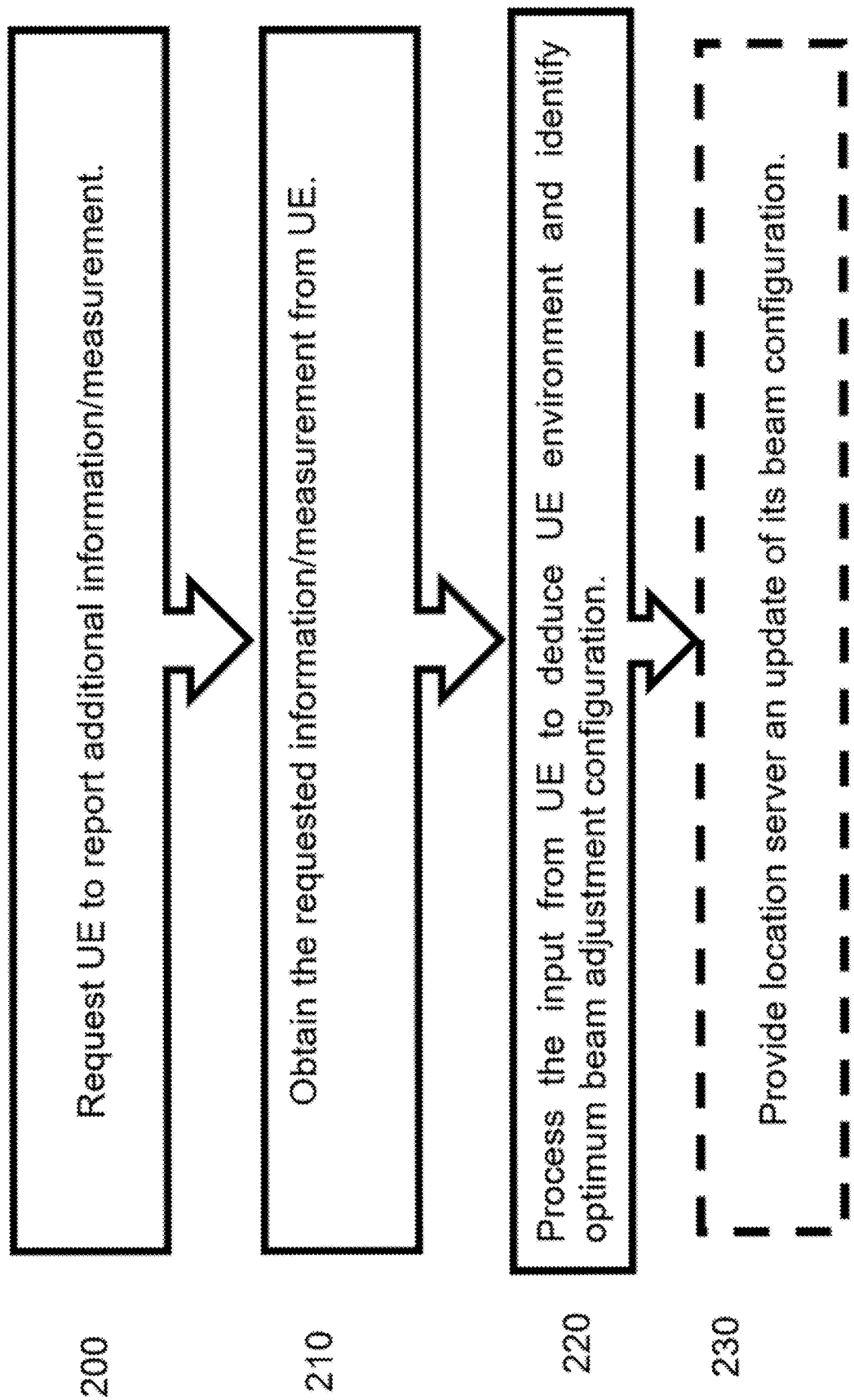
FIG. 5 is a flow chart illustrating base station operations according to some embodiments.

FIG. 5 is a flow chart illustrating base station operations according to some embodiments of inventive concepts. At operation 200, the base station may transmit a request to the UE to report additional information/measurement(s). At operation 210, the base station may obtain (e.g., receive) the requested information/measurement(s) from the UE. At operation 220, the base station may process the input from the UE to deduce the UE environment and to identify an improved/optimum beam adjustment configuration. At operation 230, the base station may provide an update of the beam configuration for the UE to a location server.

FIG. 6 is a flow chart illustrating location server operations according to some embodiments of inventive concepts. At block 300, the location server may receive the beam configuration update from the base station and keep it (e.g., store it in memory) for future reference.

Note that some radio nodes may also have location server functionality. In such cases, some or all operations can be performed by the radio node itself without seeking involvement from central location server.

According to some embodiments of inventive concepts, one or more of the following advantages may be provided. An improved/optimized beam adjustment strategy may be provided. More efficient RRM decisions may be provided, such as during handover. The beam adjustment protocol may be more sophisticated by incorporating measurements on top of conventional beam measurement. A beam may be projected which is better/best for the UE considering its environment. Beam projection may be improved by considering UE velocity and altitude. By projecting the beam away from undesired UEs, a better data rate may be provided for the desired UE, potentially with reduced interference. Stated in other words, the projected beam may be dedicated to a specific UE. Some embodiments of inventive concepts, can be exploited for other applications like positioning where the accuracy of the estimated time of arrival relies heavily on how it is transmitted to the UE. If the reference signal for positioning is transmitted to the UE exploiting additional information/measurement, the UE may have a better opportunity to perform precise time of arrival estimation. Moreover, a UE may benefit from its environment specifically tailored beam based reference signal transmission for localization.

Some embodiments of inventive concepts may include identifying the UE Environment.

The additional information requested from the UE can include (but not limited to) UE environment (indoor/outdoor), UE velocity (to identify if a UE is moving towards or away from the base station), Line of Sight (LOS) or Non-Line of Sight (NLOS) condition of the UE with respect to the base station, and/or UE altitude. The base station may use this information together with a predefined rule to adjust the favorable beam of the UE. In some embodiments, the UE may consider more than one beam as favorable due to its certain conditions.

Some embodiments of inventive concepts may include identifying the Location Source.

When a UE reports its location, the UE may also report its location information source. The location information source can be used to identify the UE environment such as being indoor, outdoor, in a tunnel, etc. FIG. 7 illustrates information elements that may be used to communicate the location information source. As shown, "a-gnss" may indicate that the UE determined its location using an assisted global navigation satellite system a-GNSS (also referred to as a global positioning system or GPS), "wlan" may indicate that the UE determined its location using a wireless local area network WLAN, "bt" may indicate that the UE determined its location using Bluetooth BT signaling, "tbs" may indicate that the UE determined its location using terrestrial beacon system positioning, "sensor" may indicate that the UE determined its location using inertial measurement unit IMU sensors, "ha-gnss-v1510" may indicate that the UE determined its location using high accuracy GNSS, and "motion-sensor-v1550" may indicate that the UE determined its location using motion sensors to detect displacement and/or movement (e.g., using accelerometers, gyros, magnetometers, etc.). The locationSource field of FIG. 7 may be provided in a CommonIEsProvidedLocationInformation message as discussed in 3GPP TS 36.355 V15.5.0 (2019-09), cited below as Reference [2]. As discussed in Reference [2], the locationSource field may provide the source positioning technology used by the UE to generate the location estimate.

When the UE reports its location using an Assisted Global Navigation Satellite System (A-GNSS or HA-GNSS), then the UE is most likely in an outdoor environment. When the UE reports its location using measurements from a Wireless Local Area Network (WLAN) or from Bluetooth (BT), then the UE is most likely in an indoor environment. Similarly, when the UE was using A-GNSS to report its location and has shifted to using an IMU (inertial measurement unit) sensor as location information source (e.g., indicated by "sensor" or "motion-sensor-v1550"), then it is most likely that the UE has entered a confined environment such as a tunnel. Besides this, the UE can be asked to specify more explicitly about its environment information. For example, the UE can also use its light sensor to analyze whether it is in an indoor or outdoor environment. Some UEs may also have a barometric pressure sensor which can be used to determine/compute its height. In addition, a UE can also report its velocity. The UE velocity along with its elevation can help improve/optimize beam projection angle.

Thus, the UE may report such parameters to the gNodeB using a Radio Resource Control RRC protocol. The UE may provide it's capability whether it can process/identify additional parameter or not. Depending upon UE capability, the gNodeB may fetch additional parameters from the UE.

Knowledge of an environment may be used as discussed below.

Knowledge of the UE environment may be further augmented with the knowledge of channel parameters and/or sensor readings at the UE. One channel characteristic which may be useful is the channel impulse response provided using a Power Delay Profile PDP. PDP may provide good information about the environment of the UE depending on the distribution of peaks in the PDP profile. This information can let the peers know if they are in Line of Sight LOS or Non-Line of Sight NLOS communication with a base station (also referred to as a radio access network RAN node). The information about this sort of propagation environment may further help a base station and/or UE beamformer to project the beam to/from the peer with more accuracy.

Figure 8A:
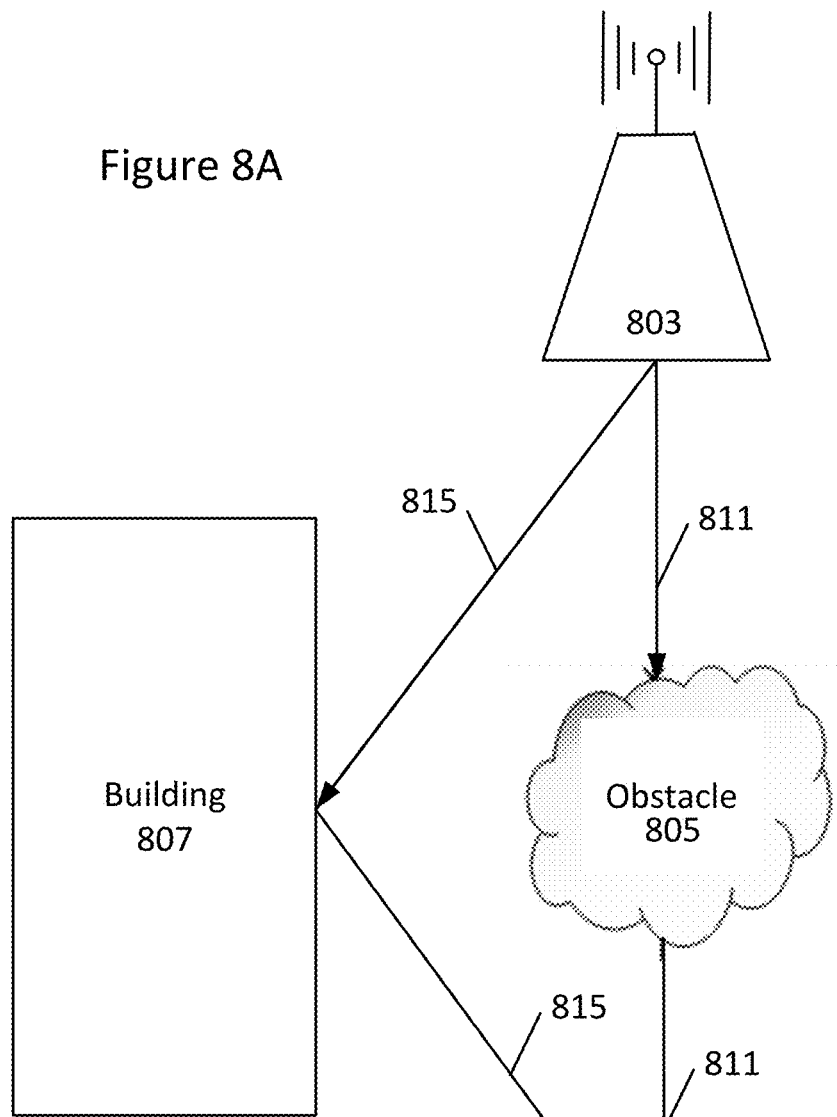
FIG. 8A is a diagram illustrating a UE location/environment resulting in multiple paths of communication between a network node and a UE according to some embodiments.

FIG. 8A illustrates an example of a UE 801 in communication with a base station 803 where an obstacle 805 is in a direct line of sight between the UE 801 and base station 803. A first (direct) transmission path 811 between the base station 803 and the UE 801 is straight but obstructed by obstacle 805, while a second (indirect) transmission path 815 reflects off building 807 without obstruction. For a given downlink transmission from base station 803 to UE 801, the downlink transmission may reach the UE first over the first transmission path 811 which is shorter but obstructed, and the downlink transmission may reach the UE over the second (reflected) transmission path 815 at a greater power (because obstacle 805 obstructs the first transmission path 811). This is illustrated in the Power Delay Profile of FIG. 8B where reception of the downlink transmission along the first transmission path 811 is indicated by the first peak 811' and wherein reception of the downlink transmission along the second transmission path 815 is indicated by the second peak 815'. The subsequent peaks of FIG. 8B may result from other reflected transmission paths not shown in FIG. 8A.

The indoor/outdoor classification information and LOS/NLOS information can be taken as an input to determine angle, orientation, etc. of the beam.

UE can report PDP information to the base station without solicitation or upon request from the base station. The reporting can also be made periodic.

According to some embodiments, the UE can report PDP information as an ENUMERATED classification (LOS, NLOS) report (indicating that the UE is either in line sight LOS communication without significant obstruction in a direct line between the UE and Base station or that the UE is in non-line of sight NLOS communication with a strongest signal being received via a reflected path), or as a BIT STRING (SIZE(4)) report. With a bit string report, each bit of the bit string may represent the delay spread sample (e.g., with each bit representing a respective transmission path, with 1 used to indicate the transmission path with the strongest signal and 0 used to indicate all other transmission paths).

For example, the power delay profile of FIG. 9 may be represented by a bit pattern of 1000 to indicate that the peak is received at the very first delay spread sample (i.e., corresponding to the straight line or direct transmission path over which the signal is first received). Accordingly, a 1000 bit pattern may indicate a LOS downlink reception environment. This situation may occur by removing the obstruction 805 from signal path 811 of FIG. 8A, so that the downlink transmission is received by UE 801 over the first transmission path 811 (now a line of sight transmission path) with greater power than is received over the second (reflected) transmission path 815.

Figure 8B:
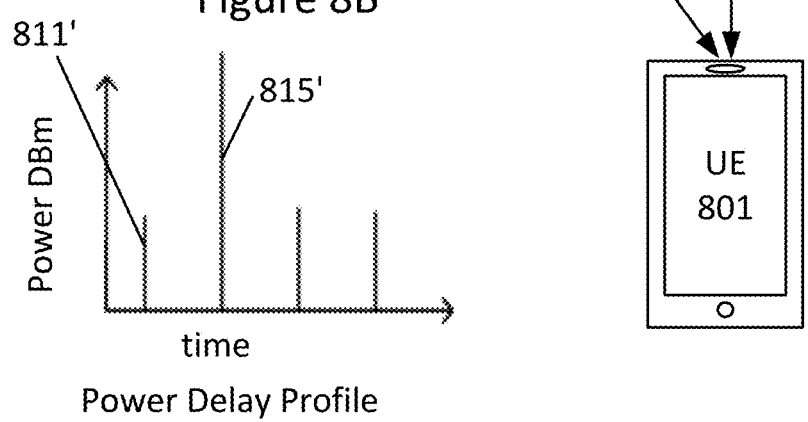
FIG. 8B is a diagram illustrating a power delay profile corresponding to the multiple paths of FIG. 8A according to some embodiments.

In contrast, a bit pattern of 0100 as shown in FIG. 8B may imply that there is no clear LOS downlink transmission (the first path is not the strongest), but instead that the strongest reception occurs over a reflected signal path or a second path as shown, for example, in FIG. 8A.

UL Beam Adjustment is discussed below.

In some embodiments, the UE can also use the PDP that is available to determine the beam projection. Similarly, the UE can use the reciprocal direction to transmit/project its uplink beam. Stated in other words, the UE can follow the DL direction for UL beam projection.

Sending/Transmitting a Power Delay Profile is discussed below.

According to some embodiments, after obtaining the additional measurement(s)/information from the UE, the base station can then identify a desired/optimum beam adjustment configuration for DL transmission. The UL beam adjustment configuration can be reciprocal to the beam adjustment configuration for the DL transmission.

According to some embodiments, the signaling between the UE and the base station may be handled via Radio Resource Control (RRC) protocol.

Radio Resource Management RRM Decisions are discussed below.

When a UE performs mobility measurements using CSI-RS (channel state information reference signals) or Positioning measurements using DL-PRS (downlink positioning reference signals), the UE is performing RSRP/RSRQ (reference signal received power and/or reference signal received quality) measurements of such reference signal(s). In addition, the UE also performs Time of Arrival (TOA) estimation of such signals especially for DL-Positioning Reference Signal (DL-PRS). While estimating TOA, UE may record the earliest path of signal arrival and additionally determine if it is in LOS with any of the neighbor cells/beams. The UE may report information (e.g., PDP, UE environment, indoor/outdoor, etc.) relating to such measurements to the serving base station. The serving base station may then decide if the UE should be handed over to the neighbor beam/cell. This is an example of how the additional parameter can be useful for gNodeB Radio Access Network (RAN) procedures. Further, if the base station (gNodeB, also referred to as a RAN node) needs to perform carrier aggregation, it knows which cells it can select for carrier aggregation. This information may also be useful if gNodeB and UE may support carrier aggregation in different forms such as intraband contiguous or non-contiguous, or inter-band non-contiguous band combinations. Based upon the reported measurement(s) from the UE regarding different TOA and/or LOS/NLOS of different cells, the gNodeB may select cells and can decide whether to opt for Carrier aggregation using intraband or interband. Further, within intraband or interband, the base station may determine which of the cells are best for carrier aggregation.

According to some embodiments, the base station may determine whether to perform a handover procedure and/or may determine that a beam from another base station may be a more favorable beam compared to the current base station's beams based on the reported additional information from the UE.

According to some embodiments, the UE may also report additional beam quality information for beams received from neighbor cells (e.g., Time of Arrival, LOS/NLOS, indoor/outdoor classification, etc.) as additional information to the base station.

Reference Signal RS Beam Optimization is discussed below.

According to some embodiments, the base station can use the UE report to improve/optimize beam transmission for reference signals such as PRS or CSI-RS. The gNodeB may have a trained Machine Learning (ML) algorithm in place or can have an ML algorithm that can be trained with other base stations to provide beam adjustment configuration. The Xn interface can be used to communicate for beam configuration.

The gNodeB obtains the RSRP along with additional information such as LOS/NLOS, TOA of the reference signal from each Beam. In order to select a most appropriate (e.g., best) beam possible for providing a good QoE (Better signal reception), the gNodeB filters which beams are suitable for UE and selects only those beams. Such an implementation may provide a bona fide advantage to deterministically adjust a beam for reference signal transmission for positioning or CSI-RS for RRM. Such an implementation may help a UE receive positioning reference signals through beams that are tailored specifically based on its location/environment and provides/ensures precise timing measurement for localization and in case of RRM aid in making better mobility decisions by selecting the appropriate CSI-RS serving and neighbor beams. Further, it may provide a mechanism to turn off beams that do not contribute towards measurement statistics such as beams which have very delayed TOA result or which are NLOS. This may provide an energy saving mechanism for the Network NW nodes.

According to some embodiments, the base station can forward the beam adjustment configuration along with the UE reported additional information/measurement(s) to a higher layer entity such as a Location and Mobility Function (LMF) node. The LMF node may have a trained Machine Learning (ML) algorithm in place, or the LMF node may have an ML algorithm that can be trained with the base station provided beam adjustment configuration along with the UE reported additional information/measurement. Such embodiments may provide an advantage to deterministically adjust a beam for reference signal transmission for positioning. Such an implementation may help the UE to receive positioning reference signals through beams that are tailored specifically based on the UE's location/environment and to provide/ensure precise timing measurement for localization. To handle this sort of information exchange, the signaling between the base station and the LMF node may be handled using Long Term Positioning Protocol-a (LPPa) or New Radio Positioning Protocol-a (NRPPa) protocol.

Beam Adjustment is discussed below.

According to some embodiments, the base station may perform a table look up operation to identify a desired/optimum beam adjustment configuration/parameter.

The beam adjustment configuration may be one of the following: Transmit or receive beam direction; Time and/or frequency resources or scheduling information for beam-associated transmissions; Transmit or receive beam width; Power boosting for beam-specific transmissions; and/or Adaptive Beam (UE specific beams). Beam association information (or rule(s)), e.g., association between network transmit beam and UE receive beam, association between network transmit and network receive beam, or association between UE transmit beam and UE receive beam, is illustrated in the table of FIG. 10A.

The look up table in its normative form may be provided as shown by the table of FIG. 10B.

As an example, if the UE is in a NLOS condition but is outdoors, the beam projection can be determined by the serving gNodeB based on the best path direction to reach UE with increased/maximum signal strength. This can be done by combining an optimum higher number of antenna elements to derive a narrow beam pointing towards the angle of departure where the UE has perceived highest/maximum RSRP value or the path among the multiple paths where the RSRP value is highest. Moreover, based on the additional info, a UE that is in LOS and outdoors can also be fairly identified by the serving cell. Upon identification of such a condition, the gNodeB can then project an improved/optimized beam only to serve this UE to reduce/minimize the interference to other UEs. In an outdoor only deployment scenario, where all gNodeBs are deployed outdoors and no gNodeB is deployed indoors, the gNodeB can also identify if a UE is in NLOS and indoor based on the additional measurement reported by the UE. In such a situation, the outdoor gNodeB can project the beam to overcome additional pathloss of the signal due wall blockage and can serve the indoor UE with better coverage. In this aspect, the serving cell in addition to the additional measurement reported by UE can also measure pathloss of the UL signal coming from UE to adjust its transmission power. Moreover, based on the estimated angle of arrival, the serving cell can project its beam/beams. In a deployment where gNodeBs are also deployed indoors, the beam projection can be fairly improved/optimized by the serving cell depending on the LOS and NLOS condition of the UE with the serving cell. The additional information in this context can also help to better position measurements typically used/required to localize the UE with precision.

An example of Info/measurement type 1 is where UE is located outdoor or indoor. The Value1 corresponding to this measurement type can be indoor.

An example of Info/measurement type 2 is NLOS/LOS. The Value1 corresponding to this measurement type can be NLOS.

An example of Info/measurement type 3 is TOA. The Value1 corresponding to this measurement type can be in time duration such as ns, microsecond, millisecond.

Based upon this, the beam may be adjusted. For example, the beam adjustment may include one or more of: Transmit or receive beam direction; Time and/or frequency resources or scheduling information for beam-associated transmissions; Transmit or receive beam width; Power boosting for beam-specific transmissions; and/or Adaptive Beam (UE specific beams, selection of beams). This adjustment may happen periodically over certain TTI, for example, based upon the corresponding value 2, value 3 etc.

Some embodiments of inventive concepts may thus provide more efficient beam adjustment/alignment.

Operations of a RAN node 400 (implemented using the structure of FIG. 12) will now be discussed with reference to the flow chart of FIG. 14 according to some embodiments of inventive concepts. For example, modules may be stored in memory 405 of FIG. 12, and these modules may provide instructions so that when the instructions of a module are executed by respective RAN node processing circuitry 403, processing circuitry 403 performs respective operations of the flow chart.

At block 1401, processing circuitry 403 may obtain information defining an operational environment in which a wireless device is operating.

At block 1405, processing circuitry 403 may manage communication with the wireless device based on the information defining the operational environment in which the wireless device is operating.

The information defining the operational environment may include an indication that the wireless device is in line of sight LOS or non-line of sight NLOS communication with the RAN node. For example, obtaining the information defining the operational environment may include receiving (through transceiver 401) the indication that the wireless device in LOS or NLOS communication with the RAN node from the wireless device. In addition or in an alternative, obtaining the information defining the operational environment may include receiving (through transceiver 401) a representation of a power delay profile PDP from the wireless device, and determining the indication based on the representation of the PDP.

The information defining the operational environment may include an indication that the wireless device is indoors, semi-indoors, or outdoors.

Obtaining the information defining the operational environment may include receiving (through transceiver 401) an identification of a location information source from the wireless device identifying a source used by the wireless device to determine a location of the wireless device and determining whether the wireless device is indoors, semi-indoors, or outdoors based on the identification of the location information source. The identification of the location information source may identify a global navigation satellite system GNSS source and the wireless device may be determined to be outdoors based on identification of the GNSS source. The identification of the location information source may identify a wireless local area network WLAN source and/or a Bluetooth BT source, and the wireless device may be determined to be indoors based on identification of the WLAN source and/or the BT source.

Obtaining the information defining the operational environment may include receiving (through transceiver 401) the indication that the wireless device is indoors, semi-indoors, or outdoors from the wireless device.

Obtaining the information defining the operational environment may include receiving (through transceiver 401) a light sensor measurement from the wireless device and determining whether the wireless device is indoors, semi-indoors, or outdoors based on the light sensor measurement.

Obtaining the information defining the operational environment may include receiving (through transceiver 401) an indication from the wireless device that a inertial sensor is used to provide location information for the wireless device and determining that the wireless device is in a confined space based on the indication that the inertial sensor is used to provide location information, and the communication with the wireless device may be managed based on determining that the wireless device is in a confined space.

Obtaining the information defining the operational environment may include receiving (through transceiver 401) time of arrival TOA information for a signal received at the wireless device, wherein the TOA information is received from the wireless device, and the communication may be managed based on the TOA information received from the wireless device.

Various operations from the flow chart of FIG. 14 may be optional with respect to some embodiments of RAN nodes and related methods.

Operations of a RAN node 400 (implemented using the structure of FIG. 12) will now be discussed with reference to the flow chart of FIG. 15 according to some embodiments of inventive concepts. For example, modules may be stored in memory 405 of FIG. 4, and these modules may provide instructions so that when the instructions of a module are executed by respective RAN node processing circuitry 403, processing circuitry 403 performs respective operations of the flow chart.

At block 1401, processing circuitry 403 may obtain information defining an operational environment in which a wireless device is operating.

At block 1503, processing circuitry may receive (through transceiver 401) a measurement of received signal quality and/or received signal power from the wireless device, with the measurement being a measurement of the received signal quality and/or the received signal power at the wireless device. For example, the received signal quality and/or the received signal power may be for at least one beam received by the wireless device from the RAN node. Moreover, the received signal quality and/or the received signal power may include a Reference Signal Received Quality RSRQ and/or a Reference Signal Received Power RSRP.

At block 1505, processing circuitry 403 may manage communication with the wireless device based on the information defining the operational environment in which the wireless device is operating and/or based on the measurement of the received signal quality and/or the received signal power Various operations from the flow chart of FIG. 15 may be optional with respect to some embodiments of RAN nodes and related methods. For example, operations of block 1503 of FIG. 15 may be optional according to some embodiments.

Operations of a RAN node 400 (implemented using the structure of FIG. 12) will now be discussed with reference to the flow charts of FIGS. 16A and 16B according to some embodiments of inventive concepts. For example, modules may be stored in memory 405 of FIG. 12, and these modules may provide instructions so that when the instructions of a module are executed by respective RAN node processing circuitry 403, processing circuitry 403 performs respective operations of the flow chart.

At block 1401, processing circuitry 403 may obtain information defining an operational environment in which a wireless device is operating.

At block 1503, processing circuitry 403 may receive (through transceiver 403) a measurement of received signal quality and/or received signal power from the wireless device, wherein the measurement is a measurement of the received signal quality and/or the received signal power at the wireless device.

At block 1605, processing circuitry 403 may manage communication with the wireless device by performing beam management for the wireless device based on the information defining the operational environment in which the wireless device is operating and/or based on the measurement of the received signal quality and/or the received signal power.

For example, performing beam management may include performing beam adjustment and/or beam alignment for the wireless device based on the information defining the operation environment in which the wireless device is operating and/or based on the measurement of the received signal quality and/or received signal power. In addition or in an alternative, performing beam management may include selecting (at block 1605A) a beam for communication with the wireless device based on the information defining the operational environment in which the wireless device is operating and/or based on the measurement of the receives signal quality and/or the received power, and communicating (at block 1605B, e.g., transmitting and/or receiving) data with the wireless device (through transceiver 401) using the beam selected for communication with the wireless device.

Various operations from the flow chart of FIGS. 16A and 16B may be optional with respect to some embodiments of RAN nodes and related methods. For example, operations of blocks 1503, 1605A, and/or 1605B of FIGS. 16A and/or 16B may be optional according to some embodiments.

Operations of a RAN node 400 (implemented using the structure of FIG. 12) will now be discussed with reference to the flow chart of FIG. 17 according to some embodiments of inventive concepts. For example, modules may be stored in memory 405 of FIG. 12, and these modules may provide instructions so that when the instructions of a module are executed by respective RAN node processing circuitry 403, processing circuitry 403 performs respective operations of the flow chart.

At block 1401, processing circuitry 403 may obtain information defining an operational environment in which a wireless device is operating.

At block 1503, processing circuitry 403 may receive (through transceiver 401) a measurement of received signal quality and/or received signal power from the wireless device, wherein the measurement is a measurement of the received signal quality and/or the received signal power at the wireless device, and wherein communication with the wireless device is managed based on the information defining the operational environment in which the wireless device is operating and/or based on the measurement of the received signal quality and/or the received signal power.

At block 1705, processing circuitry 403 may manage communication with the wireless device by performing a handover of the wireless device from the RAN node to another RAN node based on the information defining the operational environment in which the wireless device is operating and/or based on the measurement of the received signal quality and/or the received signal power.

Figure 17:
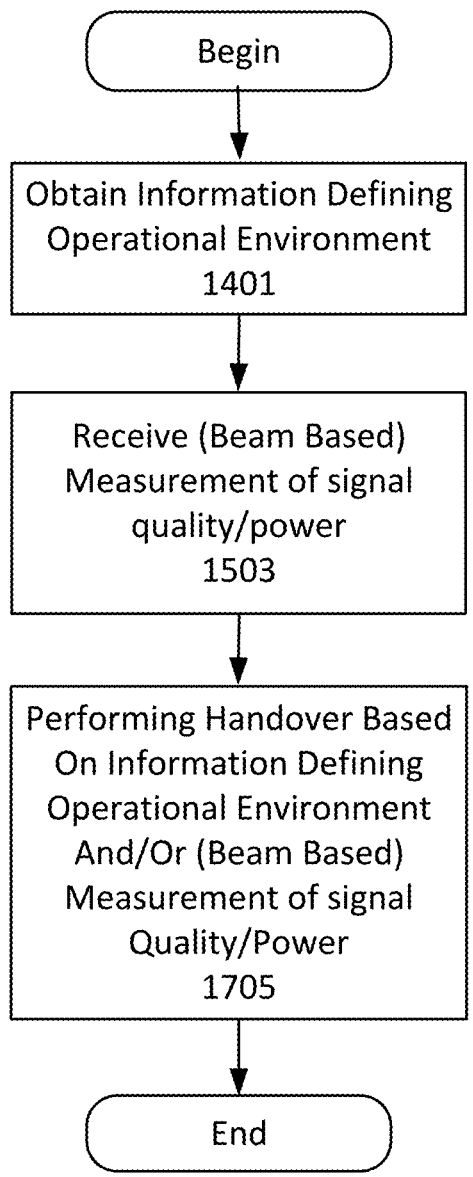

Various operations from the flow chart of FIG. 17 may be optional with respect to some embodiments of RAN nodes and related methods. For example, operations of block 1503 of FIG. 17 may be optional according to some embodiments.

Operations of a RAN node 400 (implemented using the structure of FIG. 12) will now be discussed with reference to the flow chart of FIG. 18 according to some embodiments of inventive concepts. For example, modules may be stored in memory 405 of FIG. 12, and these modules may provide instructions so that when the instructions of a module are executed by respective RAN node processing circuitry 403, processing circuitry 403 performs respective operations of the flow chart.

At block 1401, processing circuitry 403 may obtain information defining an operational environment in which a wireless device is operating.

At block 1503, processing circuitry 403 may receive (through transceiver 401) a measurement of received signal quality and/or received signal power from the wireless device, wherein the measurement is a measurement of the received signal quality and/or the received signal power at the wireless device, and wherein communication with the wireless device is managed based on the information defining the operational environment in which the wireless device is operating and/or based on the measurement of the received signal quality and/or the received signal power.

At block 1805, processing circuitry 403 may manage communication with the wireless device by performing carrier aggregation for the wireless device based on the information defining the operational environment in which the wireless device is operating and/or based on the measurement of the received signal quality and/or the received signal power. For example, performing carrier aggregation at block 1805 may include selecting (at block 1805A) at least one component carrier to provide carrier aggregation for the wireless device, and communicating (at block 1805B) data with the wireless device (e.g., transmitting and/or receiving through transceiver 401) using the at least one component carrier selected to provide carrier aggregation.

Various operations from the flow charts of FIGS. 18A and/or 18B may be optional with respect to some embodiments of RAN nodes and related methods. For example, operations of block 1503, 1805A, and/or 1805B of FIGS. 18A and/or 18B may be optional according to some embodiments.

Operations of a RAN node 400 (implemented using the structure of FIG. 12) will now be discussed with reference to the flow chart of FIG. 19 according to some embodiments of inventive concepts. For example, modules may be stored in memory 405 of FIG. 12, and these modules may provide instructions so that when the instructions of a module are executed by respective RAN node processing circuitry 403, processing circuitry 403 performs respective operations of the flow chart.

At block 1401, processing circuitry 403 may obtain information defining an operational environment in which a wireless device is operating;

At block 1503, processing circuitry 403 may receive a measurement of received signal quality and/or received signal power from the wireless device, wherein the measurement is a measurement of the received signal quality and/or the received signal power at the wireless device.

At block 1905, processing circuitry 403 may manage communication with the wireless device by controlling transmission of a reference signal based on the information defining the operational environment in which the wireless device is operating and/or based on the measurement of the received signal quality and/or the received signal power.

For example, controlling transmission may include selecting (at block 1095A) a beam for the reference signal based on the information defining the operational environment in which the wireless device is operating and/or based on the measurement of the received signal quality and/or the received signal power, and transmitting (at block 1905B) the reference signal (through transceiver 401) using the beam selected for the reference signal. Moreover, the reference signal may include at least one of a positioning reference signal PRS, a channel state information reference signal CSI-RS, and/or cell specific reference signal CRS.

Figure 19A:
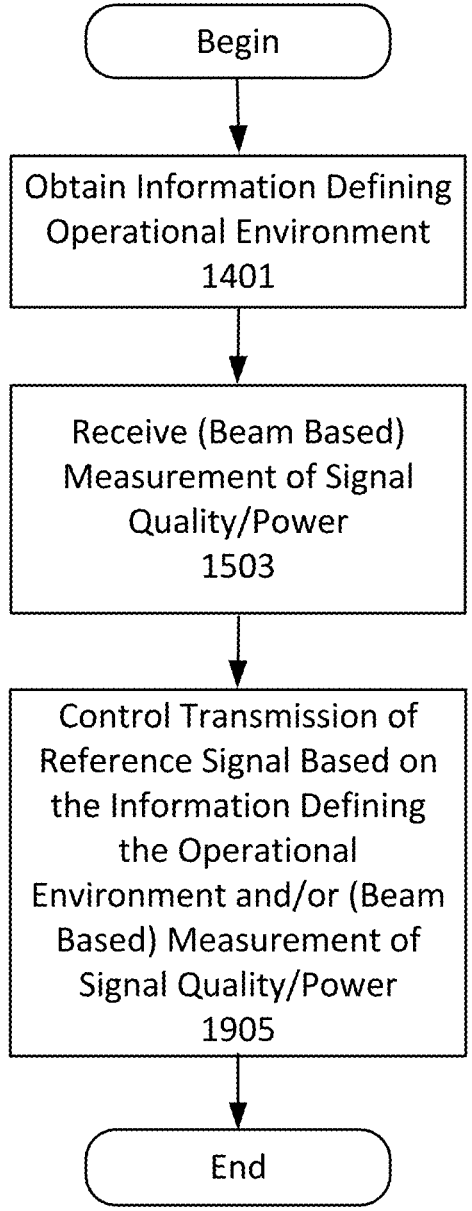
Figure 19B:
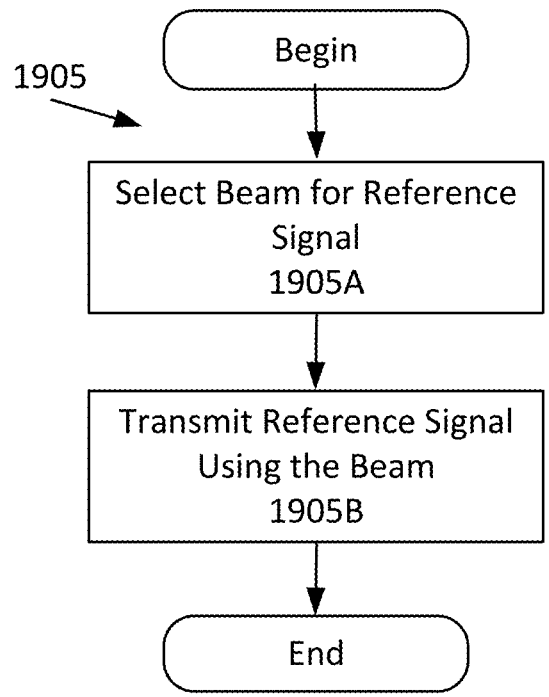

Various operations from the flow charts of FIGS. 19A and/or 19B may be optional with respect to some embodiments of RAN nodes and related methods. For example, operations of block 1503, 1905A, and/or 1905B of FIGS. 19A and/or 19B may be optional according to some embodiments.

At block 1401, processing circuitry 403 may obtain information defining an operational environment in which a wireless device is operating.

At block 2001, processing circuitry 403 may obtain information for a plurality of beams. The information for the plurality of beams may be obtained by receiving (through transceiver 401) the information from the wireless device, and the information for the plurality of beams may include a received signal quality and/or a received signal power for each of the plurality of beams. For example, the received signal quality and/or the received signal power may include a Reference Signal Received Quality, RSRQ, and/or a Reference Signal Received Power, RSRP for each of the plurality of beams.

At block 2005 processing circuitry 403 may manage communication with the wireless device by selecting a beam from the plurality of beams based on the information defining the operational environment in which the wireless device is operating and/or based on the information for the plurality of beams.

At block 2009, processing circuitry 403 may communicate (e.g., transmit and/or receive) data with the wireless device (through transceiver) using the beam selected for communication with the wireless device.

Various operations from the flow charts of FIG. 20 may be optional with respect to some embodiments of RAN nodes and related methods. For example, operations of blocks 2001 and/or 2009 of FIG. 20 may be optional according to some embodiments.

Explanations are provided below for various abbreviations/acronyms used in the present disclosure.

| Abbreviation | Explanation |
| --- | --- |
| NR | New Radio |
| OTDOA | Observed Time Difference of Arrival |
| PDP | Power Delay Profile |
| LOS | Line of Sight |
| NLOS | Non-Line of Sight |
| TDOA | Time Difference of Arrival |
| IMU | Inertial Motion Unit |
| RSRP | Reference Signal Received Power |
| RSRQ | Reference Signal Received Quality |
| UE | User Equipment |
| LPPa | LTE Positioning Protocol-a |
| NRPPa | New Radio Positioning Protocol-a |
| TOA | Time of Arrival |
| RAN | Radio Access Network |
| RS | Reference Signal |
| BS | Base Station |
| UL | Uplink |
| DL | Downlink |
| RF | Radio Frequency |
| LMF | Location and Mobility Function |
| AMF | Access and Mobility management Function |
| E-SMLC | Evolved Serving Mobile Location Centre |
| NG | Next Generation |
| GPS | Global Positioning System |
| RRM | Radio Resource Management |
| A-GNSS | Assisted Global Navigation Satellite System |
| BT | BlueTooth |
| WLAN | Wireless Local Area Network |
| RRC | Radio Resource Control |
| PRS | Positioning Reference Signal |
| ML | Machine Learning |
| 5G | $5^{th}$ Generation |
| QoE | Quality of Experience |

References are identified below.

Reference [1] U.S. Pat. No. 6,512,481, to Velazquez et al., entitled "Communication System Using Geographic Position Data," issued Jan. 28, 2003.

Reference [2] 3GPP TS 36.355 V15.5.0 (2019 September), Technical Specification Group Radio Access Network, Evolved Universal Terrestrial Radio Access (E-UTRA); LTE Positioning Protocol (LPP) (Release 15)

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 21:
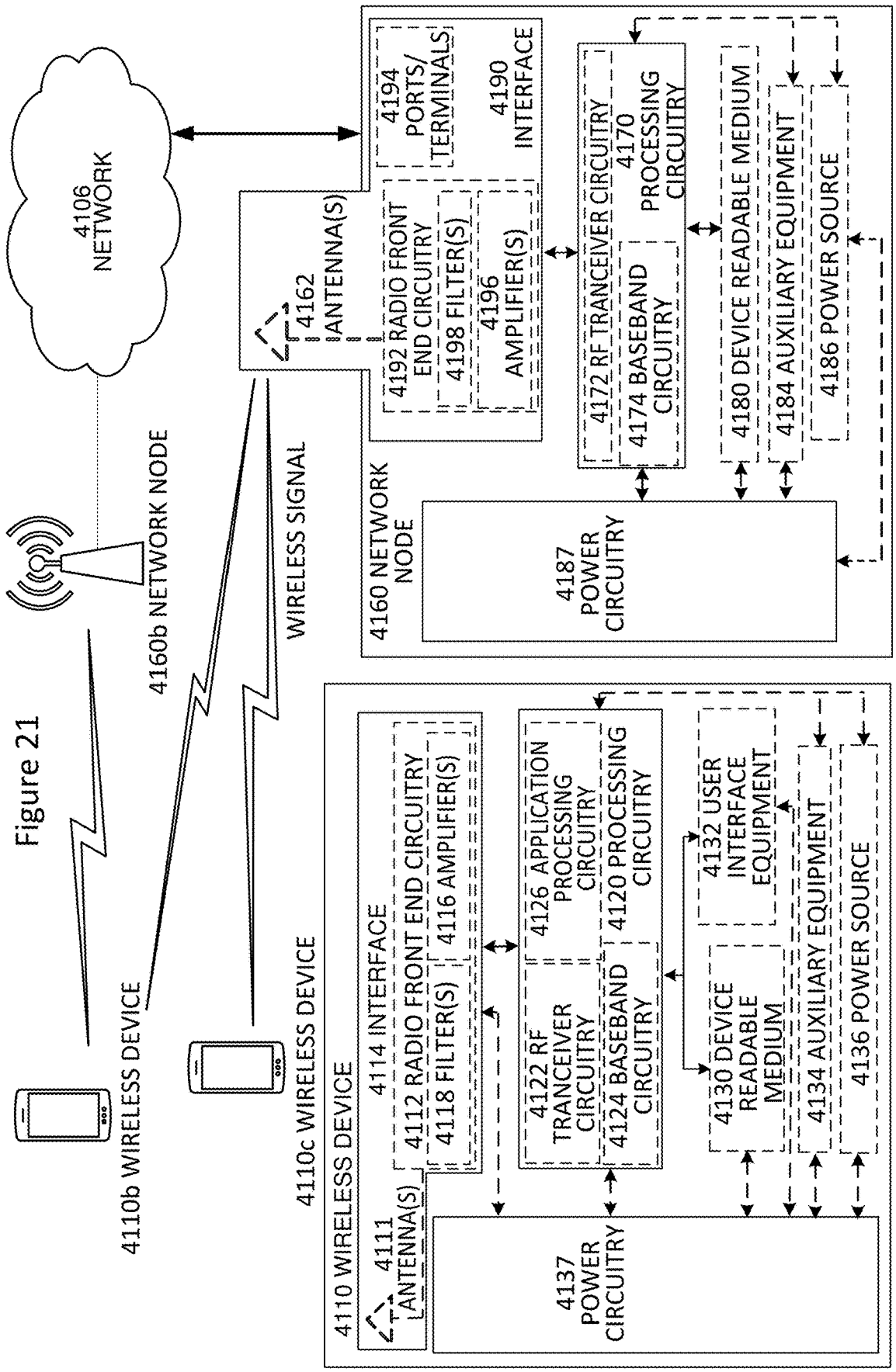
FIG. 21 is a block diagram of a wireless network in accordance with some embodiments.

FIG. 21 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 21. For simplicity, the wireless network of FIG. 21 only depicts network 4106, network nodes 4160 and 4160b, and WDs 4110, 4110b, and 4110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 4160 and wireless device (WD) 4110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 4106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 4160 and WD 4110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 21, network node 4160 includes processing circuitry 4170, device readable medium 4180, interface 4190, auxiliary equipment 4184, power source 4186, power circuitry 4187, and antenna 4162. Although network node 4160 illustrated in the example wireless network of FIG. 21 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 4160 are depicted as single boxes located within a larger box, or nested within multiple boxes, in practice, a network node may comprise multiple different physical components that make up a single illustrated component (e.g., device readable medium 4180 may comprise multiple separate hard drives as well as multiple RAM modules).

Similarly, network node 4160 may be composed of multiple physically separate components (e.g., a NodeB component and a RNC component, or a BTS component and a BSC component, etc.), which may each have their own respective components. In certain scenarios in which network node 4160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 4160 may be configured to support multiple radio access technologies (RATs). In such embodiments, some components may be duplicated (e.g., separate device readable medium 4180 for the different RATs) and some components may be reused (e.g., the same antenna 4162 may be shared by the RATs). Network node 4160 may also include multiple sets of the various illustrated components for different wireless technologies integrated into network node 4160, such as, for example, GSM, WCDMA, LTE, NR, WiFi, or Bluetooth wireless technologies. These wireless technologies may be integrated into the same or different chip or set of chips and other components within network node 4160.

Processing circuitry 4170 is configured to perform any determining, calculating, or similar operations (e.g., certain obtaining operations) described herein as being provided by a network node. These operations performed by processing circuitry 4170 may include processing information obtained by processing circuitry 4170 by, for example, converting the obtained information into other information, comparing the obtained information or converted information to information stored in the network node, and/or performing one or more operations based on the obtained information or converted information, and as a result of said processing making a determination.

Processing circuitry 4170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 4160 components, such as device readable medium 4180, network node 4160 functionality. For example, processing circuitry 4170 may execute instructions stored in device readable medium 4180 or in memory within processing circuitry 4170. Such functionality may include providing any of the various wireless features, functions, or benefits discussed herein. In some embodiments, processing circuitry 4170 may include a system on a chip (SOC).

In some embodiments, processing circuitry 4170 may include one or more of radio frequency (RF) transceiver circuitry 4172 and baseband processing circuitry 4174. In some embodiments, radio frequency (RF) transceiver circuitry 4172 and baseband processing circuitry 4174 may be on separate chips (or sets of chips), boards, or units, such as radio units and digital units. In alternative embodiments, part or all of RF transceiver circuitry 4172 and baseband processing circuitry 4174 may be on the same chip or set of chips, boards, or units In certain embodiments, some or all of the functionality described herein as being provided by a network node, base station, eNB or other such network device may be performed by processing circuitry 4170 executing instructions stored on device readable medium 4180 or memory within processing circuitry 4170. In alternative embodiments, some or all of the functionality may be provided by processing circuitry 4170 without executing instructions stored on a separate or discrete device readable medium, such as in a hard-wired manner. In any of those embodiments, whether executing instructions stored on a device readable storage medium or not, processing circuitry 4170 can be configured to perform the described functionality. The benefits provided by such functionality are not limited to processing circuitry 4170 alone or to other components of network node 4160, but are enjoyed by network node 4160 as a whole, and/or by end users and the wireless network generally.

Device readable medium 4180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 4170. Device readable medium 4180 may store any suitable instructions, data or information, including a computer program, software, an application including one or more of logic, rules, code, tables, etc. and/or other instructions capable of being executed by processing circuitry 4170 and, utilized by network node 4160. Device readable medium 4180 may be used to store any calculations made by processing circuitry 4170 and/or any data received via interface 4190. In some embodiments, processing circuitry 4170 and device readable medium 4180 may be considered to be integrated.

Interface 4190 is used in the wired or wireless communication of signalling and/or data between network node 4160, network 4106, and/or WDs 4110. As illustrated, interface 4190 comprises port(s)/terminal(s) 4194 to send and receive data, for example to and from network 4106 over a wired connection. Interface 4190 also includes radio front end circuitry 4192 that may be coupled to, or in certain embodiments a part of, antenna 4162. Radio front end circuitry 4192 comprises filters 4198 and amplifiers 4196. Radio front end circuitry 4192 may be connected to antenna 4162 and processing circuitry 4170. Radio front end circuitry may be configured to condition signals communicated between antenna 4162 and processing circuitry 4170. Radio front end circuitry 4192 may receive digital data that is to be sent out to other network nodes or WDs via a wireless connection. Radio front end circuitry 4192 may convert the digital data into a radio signal having the appropriate channel and bandwidth parameters using a combination of filters 4198 and/or amplifiers 4196. The radio signal may then be transmitted via antenna 4162. Similarly, when receiving data, antenna 4162 may collect radio signals which are then converted into digital data by radio front end circuitry 4192. The digital data may be passed to processing circuitry 4170. In other embodiments, the interface may comprise different components and/or different combinations of components.

In certain alternative embodiments, network node 4160 may not include separate radio front end circuitry 4192, instead, processing circuitry 4170 may comprise radio front end circuitry and may be connected to antenna 4162 without separate radio front end circuitry 4192. Similarly, in some embodiments, all or some of RF transceiver circuitry 4172 may be considered a part of interface 4190. In still other embodiments, interface 4190 may include one or more ports or terminals 4194, radio front end circuitry 4192, and RF transceiver circuitry 4172, as part of a radio unit (not shown), and interface 4190 may communicate with baseband processing circuitry 4174, which is part of a digital unit (not shown).

Antenna 4162 may include one or more antennas, or antenna arrays, configured to send and/or receive wireless signals. Antenna 4162 may be coupled to radio front end circuitry 4190 and may be any type of antenna capable of transmitting and receiving data and/or signals wirelessly. In some embodiments, antenna 4162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 4162 may be separate from network node 4160 and may be connectable to network node 4160 through an interface or port.

Antenna 4162, interface 4190, and/or processing circuitry 4170 may be configured to perform any receiving operations and/or certain obtaining operations described herein as being performed by a network node. Any information, data and/or signals may be received from a wireless device, another network node and/or any other network equipment. Similarly, antenna 4162, interface 4190, and/or processing circuitry 4170 may be configured to perform any transmitting operations described herein as being performed by a network node. Any information, data and/or signals may be transmitted to a wireless device, another network node and/or any other network equipment.

Power circuitry 4187 may comprise, or be coupled to, power management circuitry and is configured to supply the components of network node 4160 with power for performing the functionality described herein. Power circuitry 4187 may receive power from power source 4186. Power source 4186 and/or power circuitry 4187 may be configured to provide power to the various components of network node 4160 in a form suitable for the respective components (e.g., at a voltage and current level needed for each respective component). Power source 4186 may either be included in, or external to, power circuitry 4187 and/or network node 4160. For example, network node 4160 may be connectable to an external power source (e.g., an electricity outlet) via an input circuitry or interface such as an electrical cable, whereby the external power source supplies power to power circuitry 4187. As a further example, power source 4186 may comprise a source of power in the form of a battery or battery pack which is connected to, or integrated in, power circuitry 4187. The battery may provide backup power should the external power source fail. Other types of power sources, such as photovoltaic devices, may also be used.

Alternative embodiments of network node 4160 may include additional components beyond those shown in FIG. 21 that may be responsible for providing certain aspects of the network node's functionality, including any of the functionality described herein and/or any functionality necessary to support the subject matter described herein. For example, network node 4160 may include user interface equipment to allow input of information into network node 4160 and to allow output of information from network node 4160. This may allow a user to perform diagnostic, maintenance, repair, and other administrative functions for network node 4160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 4110 includes antenna 4111, interface 4114, processing circuitry 4120, device readable medium 4130, user interface equipment 4132, auxiliary equipment 4134, power source 4136 and power circuitry 4137. WD 4110 may include multiple sets of one or more of the illustrated components for different wireless technologies supported by WD 4110, such as, for example, GSM, WCDMA, LTE, NR, WiFi, WiMAX, or Bluetooth wireless technologies, just to mention a few. These wireless technologies may be integrated into the same or different chips or set of chips as other components within WD 4110.

Antenna 4111 may include one or more antennas or antenna arrays, configured to send and/or receive wireless signals, and is connected to interface 4114. In certain alternative embodiments, antenna 4111 may be separate from WD 4110 and be connectable to WD 4110 through an interface or port. Antenna 4111, interface 4114, and/or processing circuitry 4120 may be configured to perform any receiving or transmitting operations described herein as being performed by a WD. Any information, data and/or signals may be received from a network node and/or another WD. In some embodiments, radio front end circuitry and/or antenna 4111 may be considered an interface.

As illustrated, interface 4114 comprises radio front end circuitry 4112 and antenna 4111. Radio front end circuitry 4112 comprise one or more filters 4118 and amplifiers 4116. Radio front end circuitry 4114 is connected to antenna 4111 and processing circuitry 4120, and is configured to condition signals communicated between antenna 4111 and processing circuitry 4120. Radio front end circuitry 4112 may be coupled to or a part of antenna 4111. In some embodiments, WD 4110 may not include separate radio front end circuitry 4112; rather, processing circuitry 4120 may comprise radio front end circuitry and may be connected to antenna 4111. Similarly, in some embodiments, some or all of RF transceiver circuitry 4122 may be considered a part of interface 4114. Radio front end circuitry 4112 may receive digital data that is to be sent out to other network nodes or WDs via a wireless connection. Radio front end circuitry 4112 may convert the digital data into a radio signal having the appropriate channel and bandwidth parameters using a combination of filters 4118 and/or amplifiers 4116. The radio signal may then be transmitted via antenna 4111. Similarly, when receiving data, antenna 4111 may collect radio signals which are then converted into digital data by radio front end circuitry 4112. The digital data may be passed to processing circuitry 4120. In other embodiments, the interface may comprise different components and/or different combinations of components.

Processing circuitry 4120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 4110 components, such as device readable medium 4130, WD 4110 functionality. Such functionality may include providing any of the various wireless features or benefits discussed herein. For example, processing circuitry 4120 may execute instructions stored in device readable medium 4130 or in memory within processing circuitry 4120 to provide the functionality disclosed herein.

As illustrated, processing circuitry 4120 includes one or more of RF transceiver circuitry 4122, baseband processing circuitry 4124, and application processing circuitry 4126. In other embodiments, the processing circuitry may comprise different components and/or different combinations of components. In certain embodiments processing circuitry 4120 of WD 4110 may comprise a SOC. In some embodiments, RF transceiver circuitry 4122, baseband processing circuitry 4124, and application processing circuitry 4126 may be on separate chips or sets of chips. In alternative embodiments, part or all of baseband processing circuitry 4124 and application processing circuitry 4126 may be combined into one chip or set of chips, and RF transceiver circuitry 4122 may be on a separate chip or set of chips. In still alternative embodiments, part or all of RF transceiver circuitry 4122 and baseband processing circuitry 4124 may be on the same chip or set of chips, and application processing circuitry 4126 may be on a separate chip or set of chips. In yet other alternative embodiments, part or all of RF transceiver circuitry 4122, baseband processing circuitry 4124, and application processing circuitry 4126 may be combined in the same chip or set of chips. In some embodiments, RF transceiver circuitry 4122 may be a part of interface 4114. RF transceiver circuitry 4122 may condition RF signals for processing circuitry 4120.

In certain embodiments, some or all of the functionality described herein as being performed by a WD may be provided by processing circuitry 4120 executing instructions stored on device readable medium 4130, which in certain embodiments may be a computer-readable storage medium. In alternative embodiments, some or all of the functionality may be provided by processing circuitry 4120 without executing instructions stored on a separate or discrete device readable storage medium, such as in a hard-wired manner. In any of those particular embodiments, whether executing instructions stored on a device readable storage medium or not, processing circuitry 4120 can be configured to perform the described functionality. The benefits provided by such functionality are not limited to processing circuitry 4120 alone or to other components of WD 4110, but are enjoyed by WD 4110 as a whole, and/or by end users and the wireless network generally.

Processing circuitry 4120 may be configured to perform any determining, calculating, or similar operations (e.g., certain obtaining operations) described herein as being performed by a WD. These operations, as performed by processing circuitry 4120, may include processing information obtained by processing circuitry 4120 by, for example, converting the obtained information into other information, comparing the obtained information or converted information to information stored by WD 4110, and/or performing one or more operations based on the obtained information or converted information, and as a result of said processing making a determination.

Device readable medium 4130 may be operable to store a computer program, software, an application including one or more of logic, rules, code, tables, etc. and/or other instructions capable of being executed by processing circuitry 4120. Device readable medium 4130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 4120. In some embodiments, processing circuitry 4120 and device readable medium 4130 may be considered to be integrated.

User interface equipment 4132 may provide components that allow for a human user to interact with WD 4110. Such interaction may be of many forms, such as visual, audial, tactile, etc. User interface equipment 4132 may be operable to produce output to the user and to allow the user to provide input to WD 4110. The type of interaction may vary depending on the type of user interface equipment 4132 installed in WD 4110. For example, if WD 4110 is a smart phone, the interaction may be via a touch screen; if WD 4110 is a smart meter, the interaction may be through a screen that provides usage (e.g., the number of gallons used) or a speaker that provides an audible alert (e.g., if smoke is detected). User interface equipment 4132 may include input interfaces, devices and circuits, and output interfaces, devices and circuits. User interface equipment 4132 is configured to allow input of information into WD 4110, and is connected to processing circuitry 4120 to allow processing circuitry 4120 to process the input information. User interface equipment 4132 may include, for example, a microphone, a proximity or other sensor, keys/buttons, a touch display, one or more cameras, a USB port, or other input circuitry. User interface equipment 4132 is also configured to allow output of information from WD 4110, and to allow processing circuitry 4120 to output information from WD 4110. User interface equipment 4132 may include, for example, a speaker, a display, vibrating circuitry, a USB port, a headphone interface, or other output circuitry. Using one or more input and output interfaces, devices, and circuits, of user interface equipment 4132, WD 4110 may communicate with end users and/or the wireless network, and allow them to benefit from the functionality described herein.

Auxiliary equipment 4134 is operable to provide more specific functionality which may not be generally performed by WDs. This may comprise specialized sensors for doing measurements for various purposes, interfaces for additional types of communication such as wired communications etc. The inclusion and type of components of auxiliary equipment 4134 may vary depending on the embodiment and/or scenario.

Power source 4136 may, in some embodiments, be in the form of a battery or battery pack. Other types of power sources, such as an external power source (e.g., an electricity outlet), photovoltaic devices or power cells, may also be used. WD 4110 may further comprise power circuitry 4137 for delivering power from power source 4136 to the various parts of WD 4110 which need power from power source 4136 to carry out any functionality described or indicated herein. Power circuitry 4137 may in certain embodiments comprise power management circuitry. Power circuitry 4137 may additionally or alternatively be operable to receive power from an external power source; in which case WD 4110 may be connectable to the external power source (such as an electricity outlet) via input circuitry or an interface such as an electrical power cable. Power circuitry 4137 may also in certain embodiments be operable to deliver power from an external power source to power source 4136. This may be, for example, for the charging of power source 4136. Power circuitry 4137 may perform any formatting, converting, or other modification to the power from power source 4136 to make the power suitable for the respective components of WD 4110 to which power is supplied.

Figure 22:
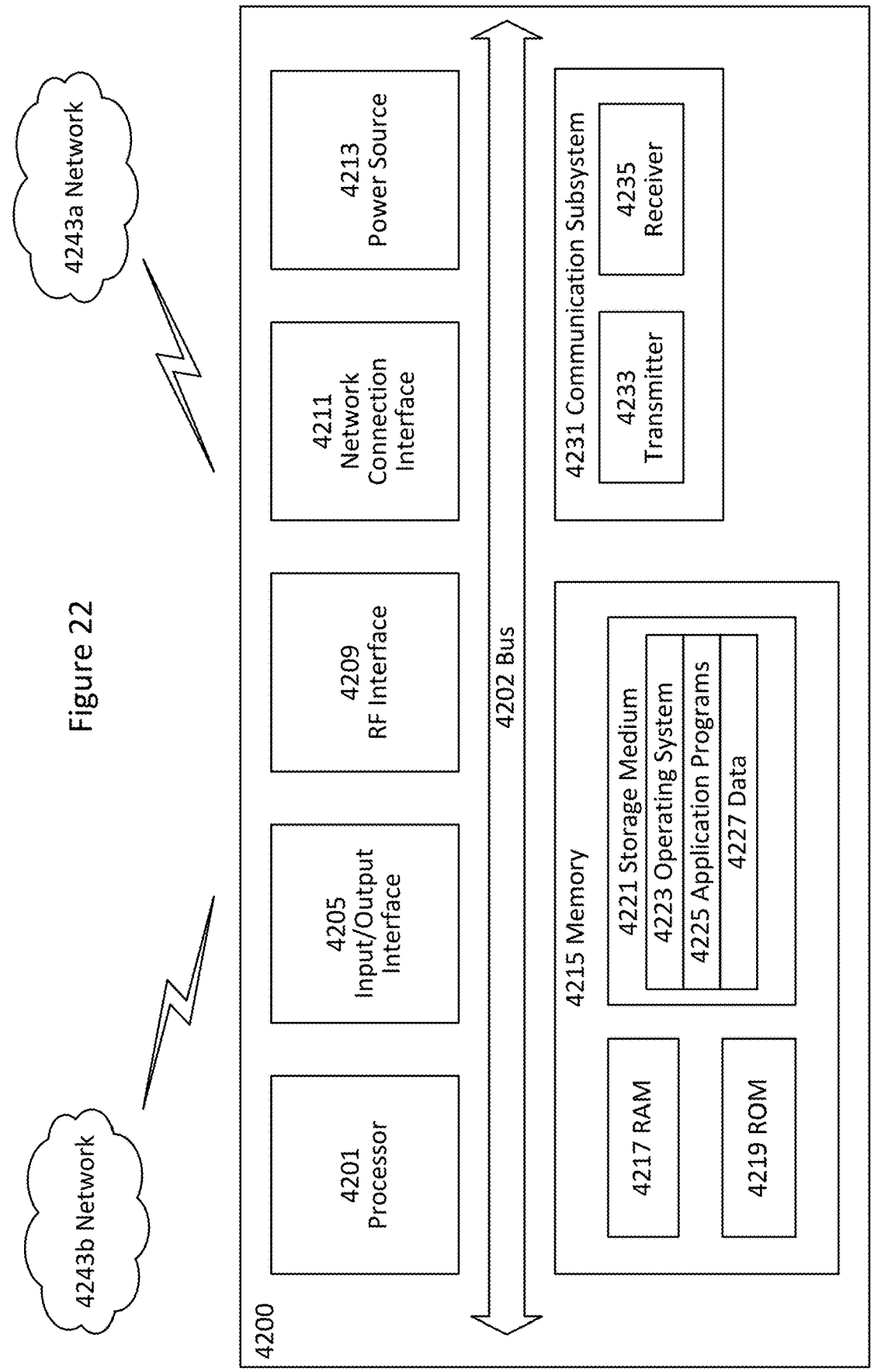
FIG. 22 is a block diagram of a user equipment in accordance with some embodiments.

FIG. 22 illustrates a user Equipment in accordance with some embodiments.

FIG. 22 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 4200 may be any UE identified by the 3rd Generation Partnership Project (3GPP), including a NB-IoT UE, a machine type communication (MTC) UE, and/or an enhanced MTC (eMTC) UE. UE 4200, as illustrated in FIG. 22, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 22 is a UE, the components discussed herein are equally applicable to a WD, and vice-versa.

In FIG. 22, UE 4200 includes processing circuitry 4201 that is operatively coupled to input/output interface 4205, radio frequency (RF) interface 4209, network connection interface 4211, memory 4215 including random access memory (RAM) 4217, read-only memory (ROM) 4219, and storage medium 4221 or the like, communication subsystem 4231, power source 4233, and/or any other component, or any combination thereof. Storage medium 4221 includes operating system 4223, application program 4225, and data 4227. In other embodiments, storage medium 4221 may include other similar types of information. Certain UEs may utilize all of the components shown in FIG. 22, or only a subset of the components. The level of integration between the components may vary from one UE to another UE. Further, certain UEs may contain multiple instances of a component, such as multiple processors, memories, transceivers, transmitters, receivers, etc.

In FIG. 22, processing circuitry 4201 may be configured to process computer instructions and data. Processing circuitry 4201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 4201 may include two central processing units (CPUs). Data may be information in a form suitable for use by a computer.

In the depicted embodiment, input/output interface 4205 may be configured to provide a communication interface to an input device, output device, or input and output device. UE 4200 may be configured to use an output device via input/output interface 4205. An output device may use the same type of interface port as an input device. For example, a USB port may be used to provide input to and output from UE 4200. The output device may be a speaker, a sound card, a video card, a display, a monitor, a printer, an actuator, an emitter, a smartcard, another output device, or any combination thereof. UE 4200 may be configured to use an input device via input/output interface 4205 to allow a user to capture information into UE 4200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 22, RF interface 4209 may be configured to provide a communication interface to RF components such as a transmitter, a receiver, and an antenna. Network connection interface 4211 may be configured to provide a communication interface to network 4243a. Network 4243a may encompass wired and/or wireless networks such as a local-area network (LAN), a wide-area network (WAN), a computer network, a wireless network, a telecommunications network, another like network or any combination thereof. For example, network 4243a may comprise a Wi-Fi network. Network connection interface 4211 may be configured to include a receiver and a transmitter interface used to communicate with one or more other devices over a communication network according to one or more communication protocols, such as Ethernet, TCP/IP, SONET, ATM, or the like. Network connection interface 4211 may implement receiver and transmitter functionality appropriate to the communication network links (e.g., optical, electrical, and the like). The transmitter and receiver functions may share circuit components, software or firmware, or alternatively may be implemented separately.

RAM 4217 may be configured to interface via bus 4202 to processing circuitry 4201 to provide storage or caching of data or computer instructions during the execution of software programs such as the operating system, application programs, and device drivers. ROM 4219 may be configured to provide computer instructions or data to processing circuitry 4201. For example, ROM 4219 may be configured to store invariant low-level system code or data for basic system functions such as basic input and output (I/O), startup, or reception of keystrokes from a keyboard that are stored in a non-volatile memory. Storage medium 4221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 4221 may be configured to include operating system 4223, application program 4225 such as a web browser application, a widget or gadget engine or another application, and data file 4227. Storage medium 4221 may store, for use by UE 4200, any of a variety of various operating systems or combinations of operating systems.

Storage medium 4221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 4221 may allow UE 4200 to access computer-executable instructions, application programs or the like, stored on transitory or non-transitory memory media, to off-load data, or to upload data. An article of manufacture, such as one utilizing a communication system may be tangibly embodied in storage medium 4221, which may comprise a device readable medium.

In FIG. 22, processing circuitry 4201 may be configured to communicate with network 4243b using communication subsystem 4231. Network 4243a and network 4243b may be the same network or networks or different network or networks. Communication subsystem 4231 may be configured to include one or more transceivers used to communicate with network 4243b. For example, communication subsystem 4231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 4233 and/or receiver 4235 to implement transmitter or receiver functionality, respectively, appropriate to the RAN links (e.g., frequency allocations and the like). Further, transmitter 4233 and receiver 4235 of each transceiver may share circuit components, software or firmware, or alternatively may be implemented separately.

In the illustrated embodiment, the communication functions of communication subsystem 4231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 4231 may include cellular communication, Wi-Fi communication, Bluetooth communication, and GPS communication. Network 4243b may encompass wired and/or wireless networks such as a local-area network (LAN), a wide-area network (WAN), a computer network, a wireless network, a telecommunications network, another like network or any combination thereof. For example, network 4243b may be a cellular network, a Wi-Fi network, and/or a near-field network. Power source 4213 may be configured to provide alternating current (AC) or direct current (DC) power to components of UE 4200.

The features, benefits and/or functions described herein may be implemented in one of the components of UE 4200 or partitioned across multiple components of UE 4200. Further, the features, benefits, and/or functions described herein may be implemented in any combination of hardware, software or firmware. In one example, communication subsystem 4231 may be configured to include any of the components described herein. Further, processing circuitry 4201 may be configured to communicate with any of such components over bus 4202. In another example, any of such components may be represented by program instructions stored in memory that when executed by processing circuitry 4201 perform the corresponding functions described herein. In another example, the functionality of any of such components may be partitioned between processing circuitry 4201 and communication subsystem 4231. In another example, the non-computationally intensive functions of any of such components may be implemented in software or firmware and the computationally intensive functions may be implemented in hardware.

Figure 23:
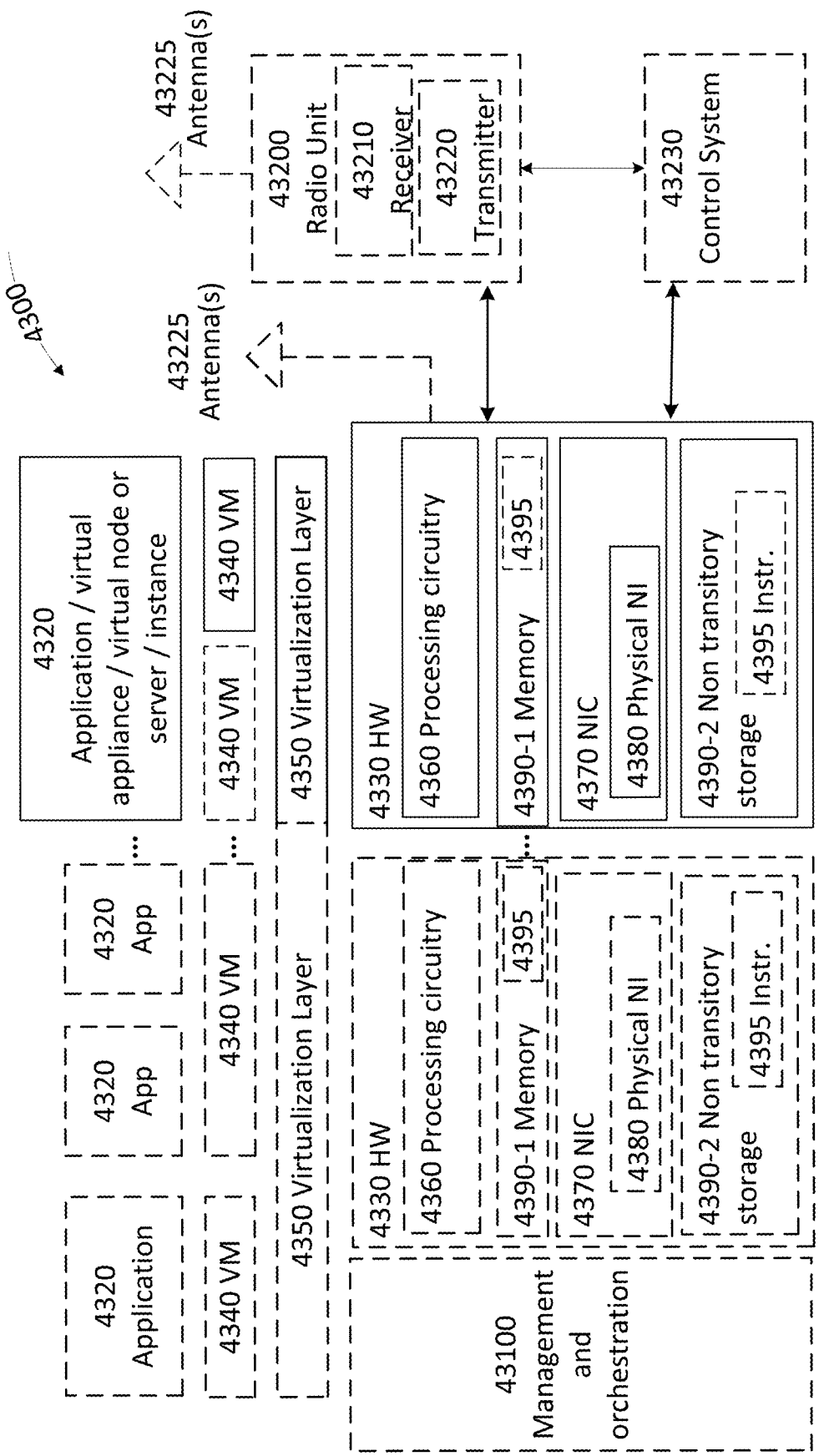
FIG. 23 is a block diagram of a virtualization environment in accordance with some embodiments.

FIG. 23 illustrates a virtualization environment in accordance with some embodiments.

FIG. 23 is a schematic block diagram illustrating a virtualization environment 4300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 4300 hosted by one or more of hardware nodes 4330. Further, in embodiments in which the virtual node is not a radio access node or does not require radio connectivity (e.g., a core network node), then the network node may be entirely virtualized.

The functions may be implemented by one or more applications 4320 (which may alternatively be called software instances, virtual appliances, network functions, virtual nodes, virtual network functions, etc.) operative to implement some of the features, functions, and/or benefits of some of the embodiments disclosed herein. Applications 4320 are run in virtualization environment 4300 which provides hardware 4330 comprising processing circuitry 4360 and memory 4390. Memory 4390 contains instructions 4395 executable by processing circuitry 4360 whereby application 4320 is operative to provide one or more of the features, benefits, and/or functions disclosed herein.

Virtualization environment 4300, comprises general-purpose or special-purpose network hardware devices 4330 comprising a set of one or more processors or processing circuitry 4360, which may be commercial off-the-shelf (COTS) processors, dedicated Application Specific Integrated Circuits (ASICs), or any other type of processing circuitry including digital or analog hardware components or special purpose processors. Each hardware device may comprise memory 4390-1 which may be non-persistent memory for temporarily storing instructions 4395 or software executed by processing circuitry 4360. Each hardware device may comprise one or more network interface controllers (NICs) 4370, also known as network interface cards, which include physical network interface 4380. Each hardware device may also include non-transitory, persistent, machine-readable storage media 4390-2 having stored therein software 4395 and/or instructions executable by processing circuitry 4360. Software 4395 may include any type of software including software for instantiating one or more virtualization layers 4350 (also referred to as hypervisors), software to execute virtual machines 4340 as well as software allowing it to execute functions, features and/or benefits described in relation with some embodiments described herein.

Virtual machines 4340 comprise virtual processing, virtual memory, virtual networking or interface and virtual storage, and may be run by a corresponding virtualization layer 4350 or hypervisor. Different embodiments of the instance of virtual appliance 4320 may be implemented on one or more of virtual machines 4340, and the implementations may be made in different ways.

During operation, processing circuitry 4360 executes software 4395 to instantiate the hypervisor or virtualization layer 4350, which may sometimes be referred to as a virtual machine monitor (VMM). Virtualization layer 4350 may present a virtual operating platform that appears like networking hardware to virtual machine 4340.

As shown in FIG. 23, hardware 4330 may be a standalone network node with generic or specific components. Hardware 4330 may comprise antenna 43225 and may implement some functions via virtualization. Alternatively, hardware 4330 may be part of a larger cluster of hardware (e.g. such as in a data center or customer premise equipment (CPE)) where many hardware nodes work together and are managed via management and orchestration (MANO) 43100, which, among others, oversees lifecycle management of applications 4320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 4340 may be a software implementation of a physical machine that runs programs as if they were executing on a physical, non-virtualized machine. Each of virtual machines 4340, and that part of hardware 4330 that executes that virtual machine, be it hardware dedicated to that virtual machine and/or hardware shared by that virtual machine with others of the virtual machines 4340, forms a separate virtual network elements (VNE).

Still in the context of NFV, Virtual Network Function (VNF) is responsible for handling specific network functions that run in one or more virtual machines 4340 on top of hardware networking infrastructure 4330 and corresponds to application 4320 in FIG. 23.

In some embodiments, one or more radio units 43200 that each include one or more transmitters 43220 and one or more receivers 43210 may be coupled to one or more antennas 43225. Radio units 43200 may communicate directly with hardware nodes 4330 via one or more appropriate network interfaces and may be used in combination with the virtual components to provide a virtual node with radio capabilities, such as a radio access node or a base station.

In some embodiments, some signalling can be effected with the use of control system 43230 which may alternatively be used for communication between the hardware nodes 4330 and radio units 43200.

Figure 24:
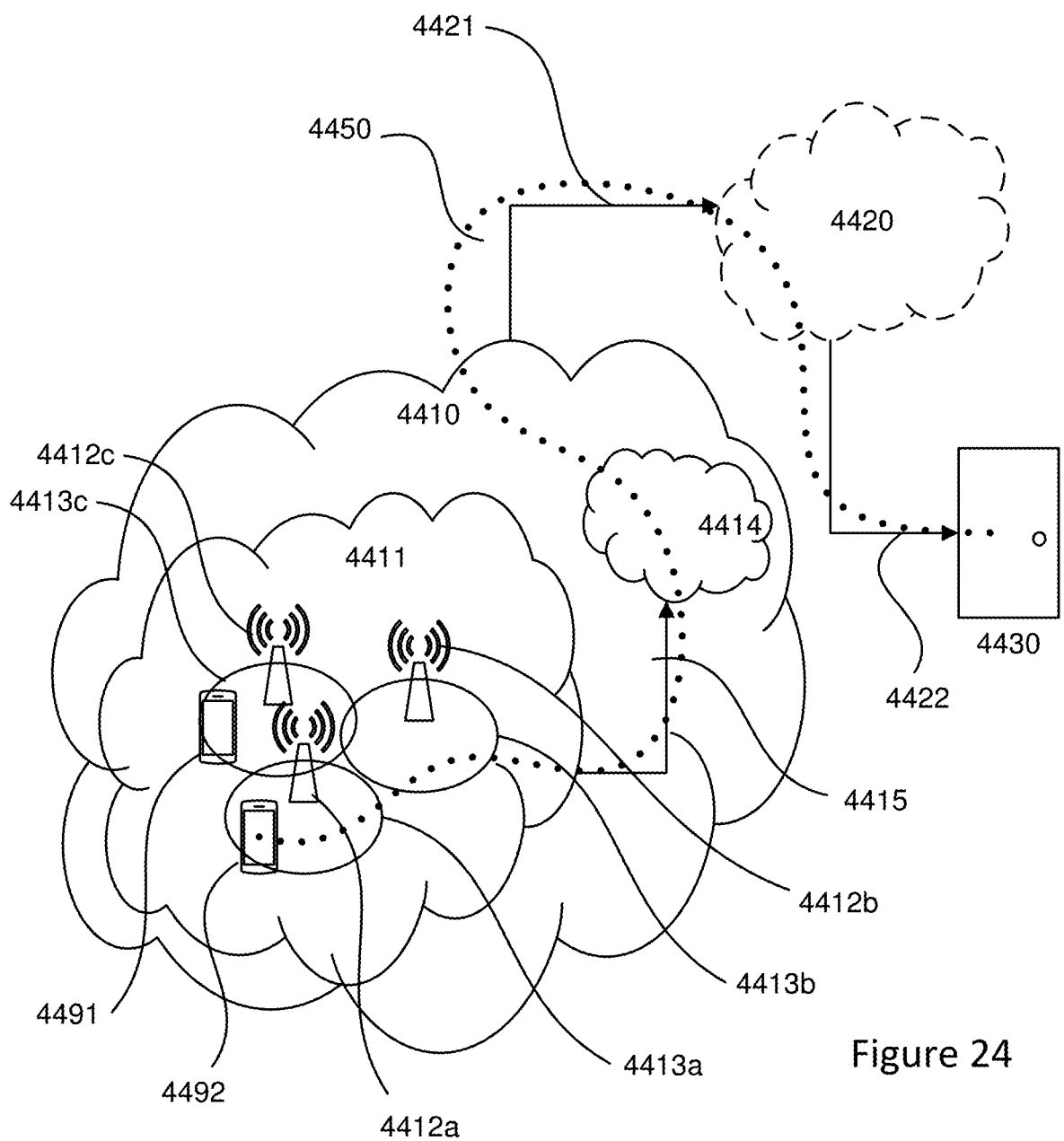
FIG. 24 is a block diagram of a telecommunication network connected via an intermediate network to a host computer in accordance with some embodiments.

FIG. 24 illustrates a telecommunication network connected via an intermediate network to a host computer in accordance with some embodiments.

With reference to FIG. 24, in accordance with an embodiment, a communication system includes telecommunication network 4410, such as a 3GPP-type cellular network, which comprises access network 4411, such as a radio access network, and core network 4414. Access network 4411 comprises a plurality of base stations 4412a, 4412b, 4412c, such as NBs, eNBs, gNBs or other types of wireless access points, each defining a corresponding coverage area 4413a, 4413b, 4413c. Each base station 4412a, 4412b, 4412c is connectable to core network 4414 over a wired or wireless connection 4415. A first UE 4491 located in coverage area 4413c is configured to wirelessly connect to, or be paged by, the corresponding base station 4412c. A second UE 4492 in coverage area 4413a is wirelessly connectable to the corresponding base station 4412a. While a plurality of UEs 4491, 4492 are illustrated in this example, the disclosed embodiments are equally applicable to a situation where a sole UE is in the coverage area or where a sole UE is connecting to the corresponding base station 4412.

Telecommunication network 4410 is itself connected to host computer 4430, which may be embodied in the hardware and/or software of a standalone server, a cloud-implemented server, a distributed server or as processing resources in a server farm. Host computer 4430 may be under the ownership or control of a service provider, or may be operated by the service provider or on behalf of the service provider. Connections 4421 and 4422 between telecommunication network 4410 and host computer 4430 may extend directly from core network 4414 to host computer 4430 or may go via an optional intermediate network 4420. Intermediate network 4420 may be one of, or a combination of more than one of, a public, private or hosted network; intermediate network 4420, if any, may be a backbone network or the Internet; in particular, intermediate network 4420 may comprise two or more sub-networks (not shown).

The communication system of FIG. 24 as a whole enables connectivity between the connected UEs 4491, 4492 and host computer 4430. The connectivity may be described as an over-the-top (OTT) connection 4450. Host computer 4430 and the connected UEs 4491, 4492 are configured to communicate data and/or signaling via OTT connection 4450, using access network 4411, core network 4414, any intermediate network 4420 and possible further infrastructure (not shown) as intermediaries. OTT connection 4450 may be transparent in the sense that the participating communication devices through which OTT connection 4450 passes are unaware of routing of uplink and downlink communications. For example, base station 4412 may not or need not be informed about the past routing of an incoming downlink communication with data originating from host computer 4430 to be forwarded (e.g., handed over) to a connected UE 4491. Similarly, base station 4412 need not be aware of the future routing of an outgoing uplink communication originating from the UE 4491 towards the host computer 4430.

Figure 25:
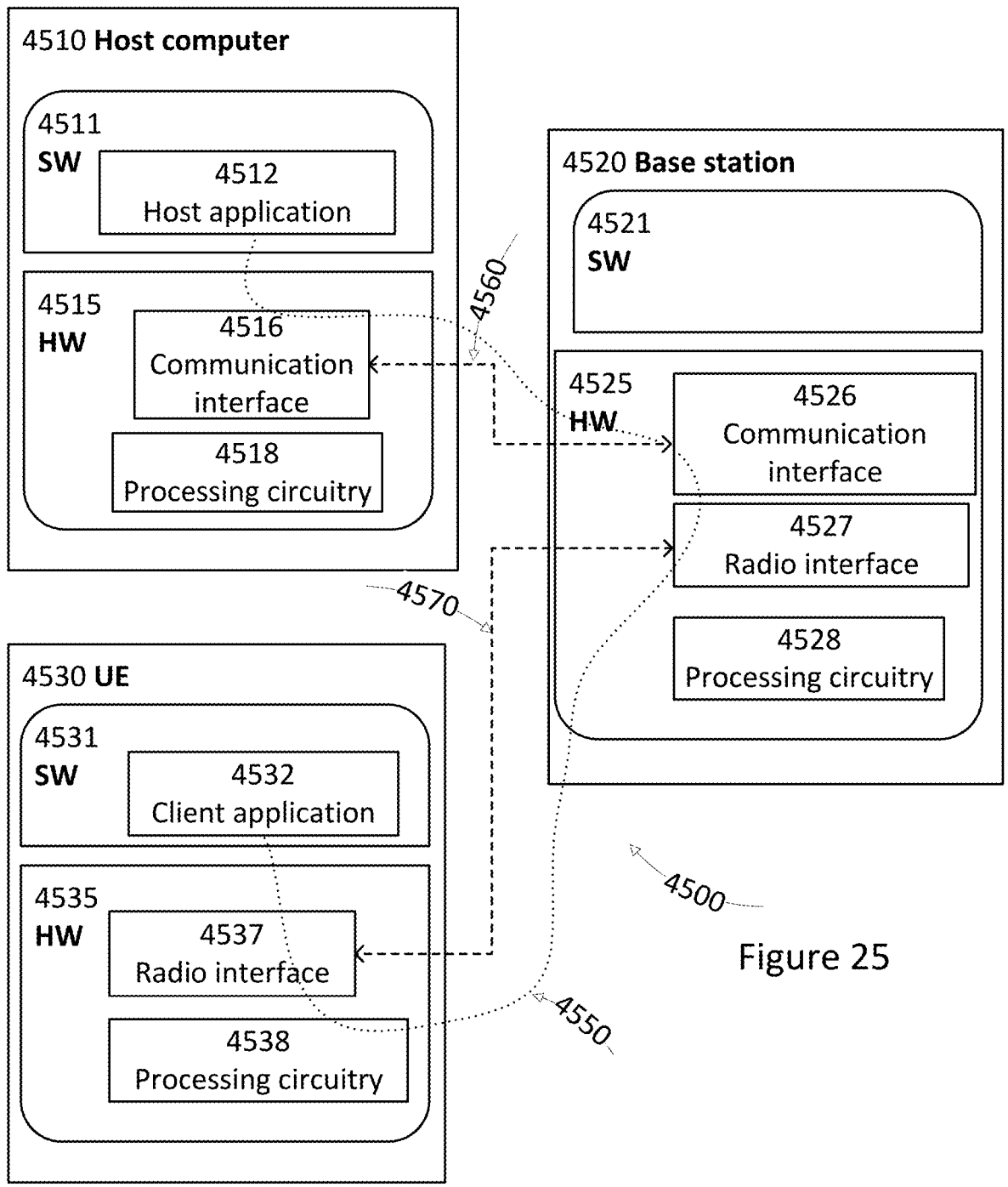
FIG. 25 is a block diagram of a host computer communicating via a base station with a user equipment over a partially wireless connection in accordance with some embodiments.

FIG. 25 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 25. In communication system 4500, host computer 4510 comprises hardware 4515 including communication interface 4516 configured to set up and maintain a wired or wireless connection with an interface of a different communication device of communication system 4500. Host computer 4510 further comprises processing circuitry 4518, which may have storage and/or processing capabilities. In particular, processing circuitry 4518 may comprise one or more programmable processors, application-specific integrated circuits, field programmable gate arrays or combinations of these (not shown) adapted to execute instructions. Host computer 4510 further comprises software 4511, which is stored in or accessible by host computer 4510 and executable by processing circuitry 4518. Software 4511 includes host application 4512. Host application 4512 may be operable to provide a service to a remote user, such as UE 4530 connecting via OTT connection 4550 terminating at UE 4530 and host computer 4510. In providing the service to the remote user, host application 4512 may provide user data which is transmitted using OTT connection 4550.

Communication system 4500 further includes base station 4520 provided in a telecommunication system and comprising hardware 4525 enabling it to communicate with host computer 4510 and with UE 4530. Hardware 4525 may include communication interface 4526 for setting up and maintaining a wired or wireless connection with an interface of a different communication device of communication system 4500, as well as radio interface 4527 for setting up and maintaining at least wireless connection 4570 with UE 4530 located in a coverage area (not shown in FIG. 25) served by base station 4520. Communication interface 4526 may be configured to facilitate connection 4560 to host computer 4510. Connection 4560 may be direct or it may pass through a core network (not shown in FIG. 25) of the telecommunication system and/or through one or more intermediate networks outside the telecommunication system. In the embodiment shown, hardware 4525 of base station 4520 further includes processing circuitry 4528, which may comprise one or more programmable processors, application-specific integrated circuits, field programmable gate arrays or combinations of these (not shown) adapted to execute instructions. Base station 4520 further has software 4521 stored internally or accessible via an external connection.

Communication system 4500 further includes UE 4530 already referred to. Its hardware 4535 may include radio interface 4537 configured to set up and maintain wireless connection 4570 with a base station serving a coverage area in which UE 4530 is currently located. Hardware 4535 of UE 4530 further includes processing circuitry 4538, which may comprise one or more programmable processors, application-specific integrated circuits, field programmable gate arrays or combinations of these (not shown) adapted to execute instructions. UE 4530 further comprises software 4531, which is stored in or accessible by UE 4530 and executable by processing circuitry 4538. Software 4531 includes client application 4532. Client application 4532 may be operable to provide a service to a human or non-human user via UE 4530, with the support of host computer 4510. In host computer 4510, an executing host application 4512 may communicate with the executing client application 4532 via OTT connection 4550 terminating at UE 4530 and host computer 4510. In providing the service to the user, client application 4532 may receive request data from host application 4512 and provide user data in response to the request data. OTT connection 4550 may transfer both the request data and the user data. Client application 4532 may interact with the user to generate the user data that it provides.

It is noted that host computer 4510, base station 4520 and UE 4530 illustrated in FIG. 25 may be similar or identical to host computer 4430, one of base stations 4412a, 4412b, 4412c and one of UEs 4491, 4492 of FIG. 24, respectively. This is to say, the inner workings of these entities may be as shown in FIG. 25 and independently, the surrounding network topology may be that of FIG. 24.

In FIG. 25, OTT connection 4550 has been drawn abstractly to illustrate the communication between host computer 4510 and UE 4530 via base station 4520, without explicit reference to any intermediary devices and the precise routing of messages via these devices. Network infrastructure may determine the routing, which it may be configured to hide from UE 4530 or from the service provider operating host computer 4510, or both. While OTT connection 4550 is active, the network infrastructure may further take decisions by which it dynamically changes the routing (e.g., on the basis of load balancing consideration or reconfiguration of the network).

Wireless connection 4570 between UE 4530 and base station 4520 is in accordance with the teachings of the embodiments described throughout this disclosure. One or more of the various embodiments may improve the performance of OTT services provided to UE 4530 using OTT connection 4550, in which wireless connection 4570 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection 4550 between host computer 4510 and UE 4530, in response to variations in the measurement results. The measurement procedure and/or the network functionality for reconfiguring OTT connection 4550 may be implemented in software 4511 and hardware 4515 of host computer 4510 or in software 4531 and hardware 4535 of UE 4530, or both. In embodiments, sensors (not shown) may be deployed in or in association with communication devices through which OTT connection 4550 passes; the sensors may participate in the measurement procedure by supplying values of the monitored quantities exemplified above, or supplying values of other physical quantities from which software 4511, 4531 may compute or estimate the monitored quantities. The reconfiguring of OTT connection 4550 may include message format, retransmission settings, preferred routing etc.; the reconfiguring need not affect base station 4520, and it may be unknown or imperceptible to base station 4520. Such procedures and functionalities may be known and practiced in the art. In certain embodiments, measurements may involve proprietary UE signaling facilitating host computer 4510's measurements of throughput, propagation times, latency and the like. The measurements may be implemented in that software 4511 and 4531 causes messages to be transmitted, in particular empty or 'dummy' messages, using OTT connection 4550 while it monitors propagation times, errors etc.

Figure 26:
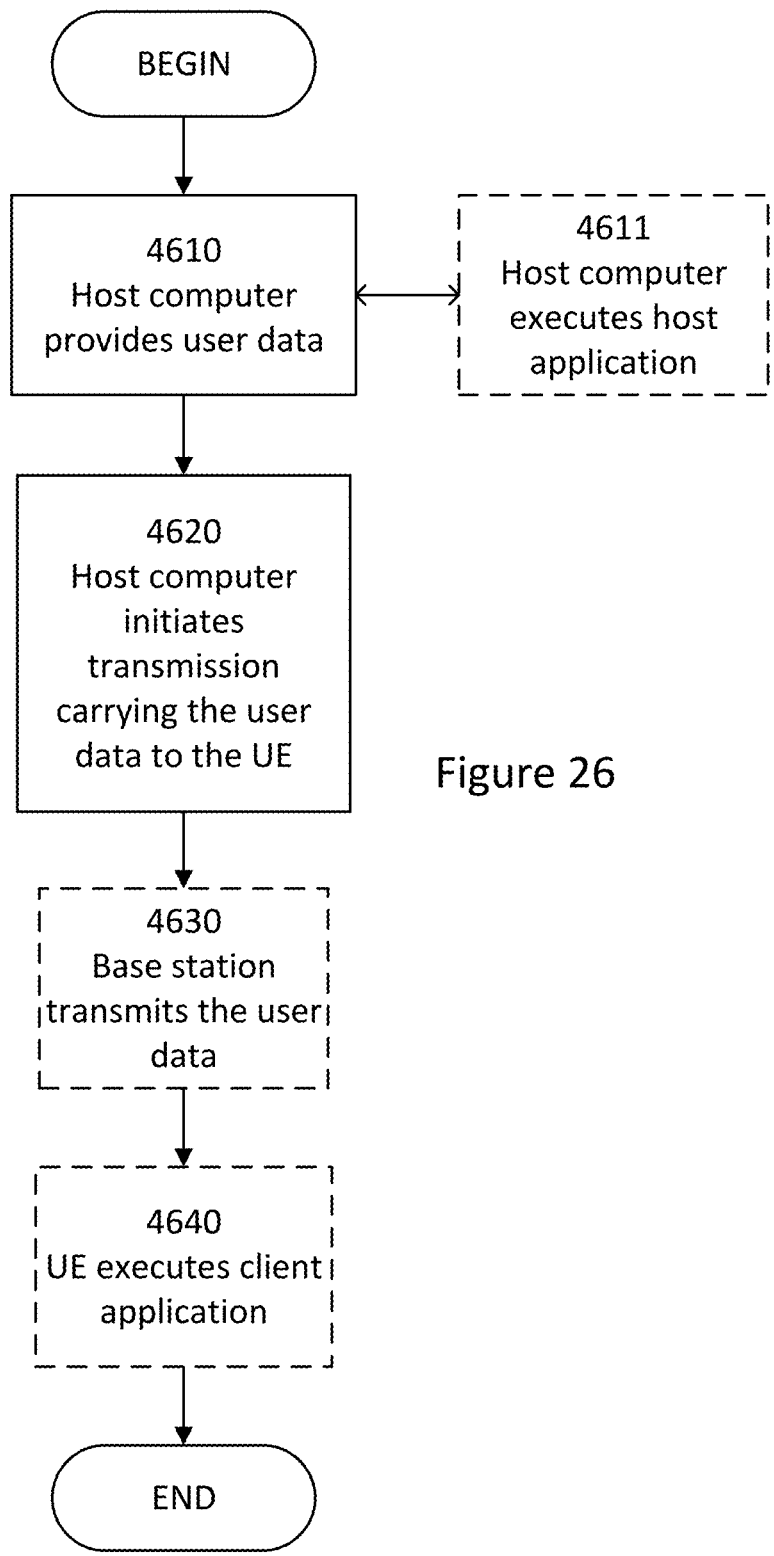
FIG. 26 is a block diagram of methods implemented in a communication system including a host computer, a base station and a user equipment in accordance with some embodiments.

FIG. 26 illustrates methods implemented in a communication system including a host computer, a base station and a user equipment in accordance with some embodiments FIG. 26 is a flowchart illustrating a method implemented in a communication system, in accordance with one embodiment. The communication system includes a host computer, a base station and a UE which may be those described with reference to FIGS. 24 and 25. For simplicity of the present disclosure, only drawing references to FIG. 26 will be included in this section. In step 4610, the host computer provides user data. In substep 4611 (which may be optional) of step 4610, the host computer provides the user data by executing a host application. In step 4620, the host computer initiates a transmission carrying the user data to the UE. In step 4630 (which may be optional), the base station transmits to the UE the user data which was carried in the transmission that the host computer initiated, in accordance with the teachings of the embodiments described throughout this disclosure. In step 4640 (which may also be optional), the UE executes a client application associated with the host application executed by the host computer.

Figure 27:
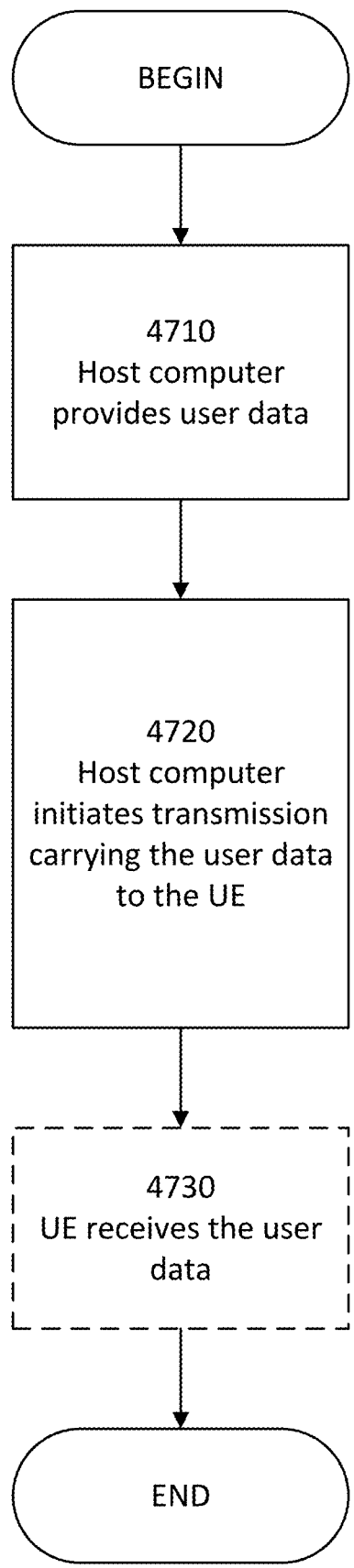
FIG. 27 is a block diagram of methods implemented in a communication system including a host computer, a base station and a user equipment in accordance with some embodiments.

FIG. 27 illustrates methods implemented in a communication system including a host computer, a base station and a user equipment in accordance with some embodiments.

FIG. 27 is a flowchart illustrating a method implemented in a communication system, in accordance with one embodiment. The communication system includes a host computer, a base station and a UE which may be those described with reference to FIGS. 24 and 25. For simplicity of the present disclosure, only drawing references to FIG. 27 will be included in this section. In step 4710 of the method, the host computer provides user data. In an optional substep (not shown) the host computer provides the user data by executing a host application. In step 4720, the host computer initiates a transmission carrying the user data to the UE. The transmission may pass via the base station, in accordance with the teachings of the embodiments described throughout this disclosure. In step 4730 (which may be optional), the UE receives the user data carried in the transmission.

Figure 28:
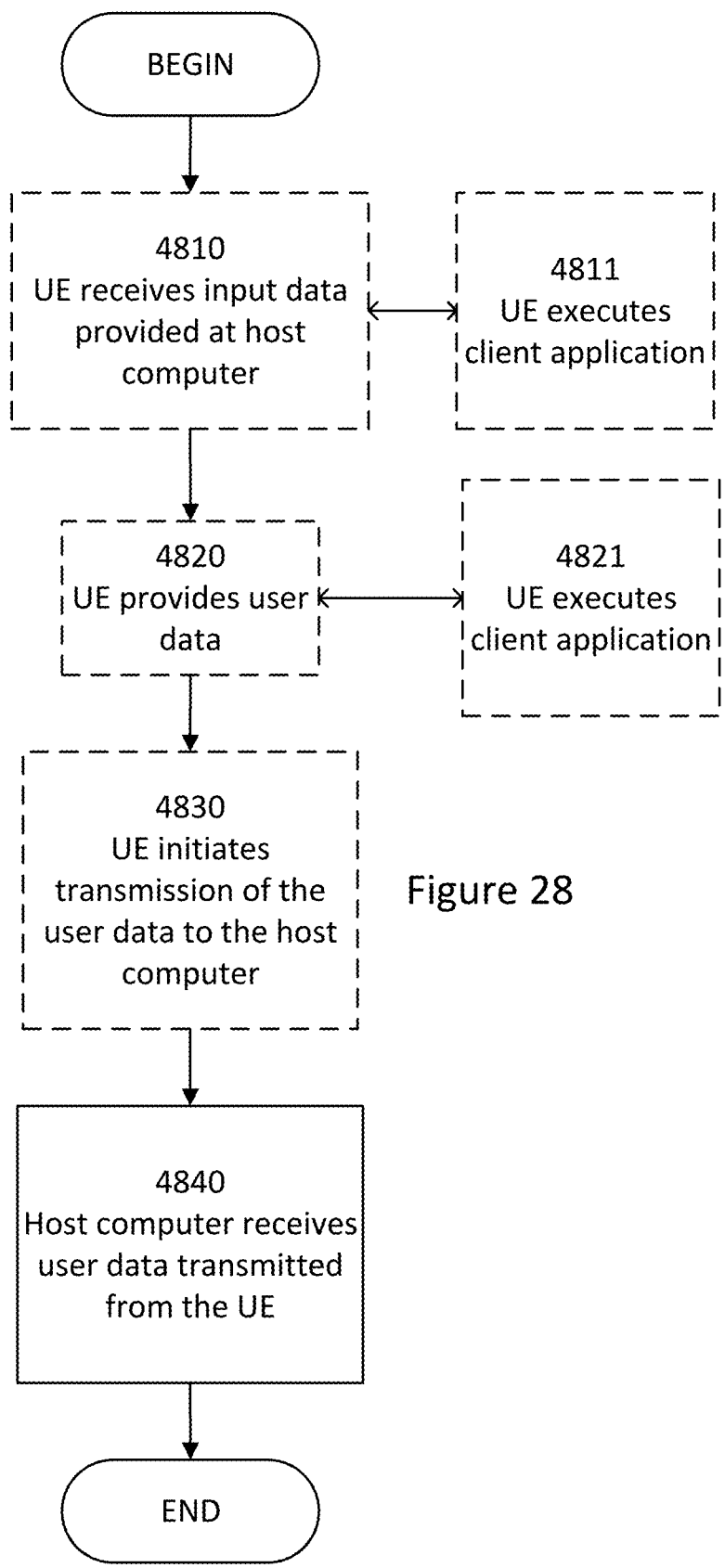
FIG. 28 is a block diagram of methods implemented in a communication system including a host computer, a base station and a user equipment in accordance with some embodiments.

FIG. 28 illustrates methods implemented in a communication system including a host computer, a base station and a user equipment in accordance with some embodiments FIG. 28 is a flowchart illustrating a method implemented in a communication system, in accordance with one embodiment. The communication system includes a host computer, a base station and a UE which may be those described with reference to FIGS. 24 and 25. For simplicity of the present disclosure, only drawing references to FIG. 28 will be included in this section. In step 4810 (which may be optional), the UE receives input data provided by the host computer. Additionally or alternatively, in step 4820, the UE provides user data. In substep 4821 (which may be optional) of step 4820, the UE provides the user data by executing a client application. In substep 4811 (which may be optional) of step 4810, the UE executes a client application which provides the user data in reaction to the received input data provided by the host computer. In providing the user data, the executed client application may further consider user input received from the user. Regardless of the specific manner in which the user data was provided, the UE initiates, in substep 4830 (which may be optional), transmission of the user data to the host computer. In step 4840 of the method, the host computer receives the user data transmitted from the UE, in accordance with the teachings of the embodiments described throughout this disclosure.

Figure 29:
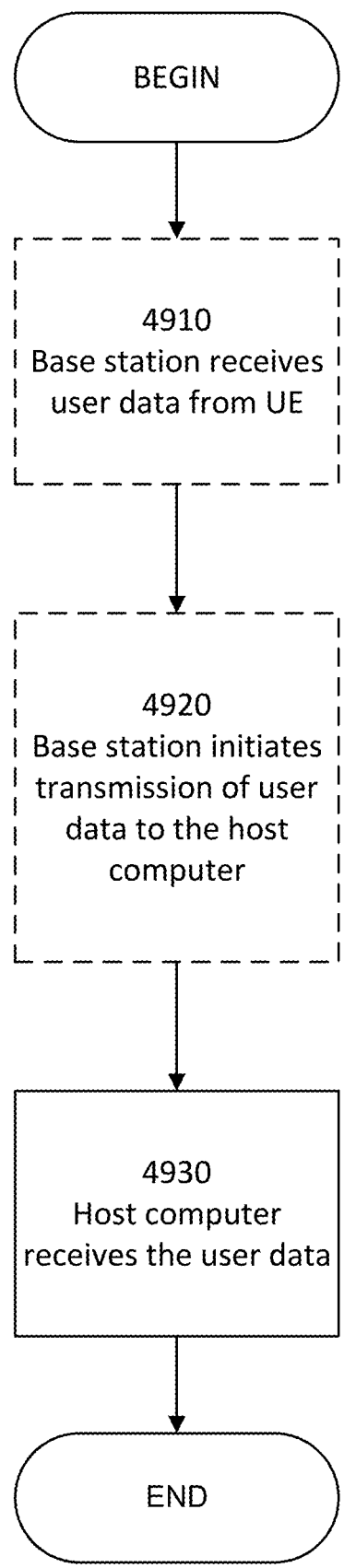
FIG. 29 is a block diagram of methods implemented in a communication system including a host computer, a base station and a user equipment in accordance with some embodiments.

FIG. 29 illustrates methods implemented in a communication system including a host computer, a base station and a user equipment in accordance with some embodiments FIG. 29 is a flowchart illustrating a method implemented in a communication system, in accordance with one embodiment. The communication system includes a host computer, a base station and a UE which may be those described with reference to FIGS. 24 and 25. For simplicity of the present disclosure, only drawing references to FIG. 29 will be included in this section. In step 4910 (which may be optional), in accordance with the teachings of the embodiments described throughout this disclosure, the base station receives user data from the UE. In step 4920 (which may be optional), the base station initiates transmission of the received user data to the host computer. In step 4930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Abbreviations

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a Radio Access Network, RAN, node of a wireless communication network, the method comprising:

obtaining information defining an operational environment in which a wireless device is operating, wherein the obtaining information comprises:
receiving a light sensor measurement from the wireless device through a wireless transceiver,
determining, based on the light sensor measurement, whether the wireless device is indoors, semi-indoors, or outdoors; and
managing communication with the wireless device based on the information defining the operational environment in which the wireless device is operating.

2. The method of claim 1 further comprising:
receiving a measurement of received signal quality and/or received signal power from the wireless device, wherein the measurement is a measurement of the received signal quality and/or the received signal power at the wireless device, and wherein communication with the wireless device is managed based on the information defining the operational environment in which the wireless device is operating and based on the measurement of the received signal quality and/or the received signal power.

3. The method of claim 2, wherein the received signal quality and/or the received signal power is for at least one beam received by the wireless device from the RAN node.

4. The method of claim 2, wherein the received signal quality and/or the received signal power comprises a Reference Signal Received Quality, RSRQ, and/or a Reference Signal Received Power, RSRP.

5. The method of claim 1, wherein managing communication comprises performing beam management for the wireless device based on the information defining the operational environment in which the wireless device is operating.

6. The method of claim 5, where performing beam management comprises performing beam adjustment and/or beam alignment for the wireless device based on the information defining the operation environment in which the wireless device is operating.

7. The method of claim 5, wherein performing beam management comprises selecting a beam for communication with the wireless device based on the information defining the operational environment in which the wireless device is operating, and communicating data with the wireless device using the beam selected for communication with the wireless device.

8. The method of claim 1, wherein the RAN node is a first RAN node, wherein managing communication comprises performing handover of the wireless device from the first RAN node to a second RAN node based on the information defining the operational environment in which the wireless device is operating.

9. The method of claim 1, wherein managing communication comprises performing carrier aggregation for the wireless device based on the information defining the operational environment in which the wireless device is operating.

10. The method of claim 9, wherein performing carrier aggregation comprises selecting at least one component carrier to provide carrier aggregation for the wireless device, and communicating data with the wireless device using the at least one component carrier selected to provide carrier aggregation.

11. The method of claim 1, wherein managing communication comprises controlling transmission of a reference signal based on the information defining the operational environment in which the wireless device is operating.

12. The method of claim 11, wherein controlling transmission comprises selecting a beam for the reference signal based on the information defining the operational environment in which the wireless device is operating, and transmitting the reference signal using the beam selected for the reference signal.

13. The method of claim 11, wherein the reference signal comprises at least one of a positioning reference signal, PRS, a channel state information reference signal, CSI-RS, and/or cell specific reference signal, CRS.

14. The method of claim 1, wherein the information defining the operational environment comprises an indication that the wireless device is in line of sight, LOS, or non-line of sight, NLOS, communication with the RAN node.

15. The method of claim 14, wherein obtaining the information defining the operational environment comprises receiving the indication that the wireless device in LOS or NLOS communication with the RAN node from the wireless device.

16. The method of claim 14, wherein obtaining the information defining the operational environment comprises receiving a representation of a power delay profile, PDP, from the wireless device, and determining the indication based on the representation of the PDP.

17. The method of claim 1, wherein obtaining the information defining the operational environment comprises receiving an identification of a location information source from the wireless device identifying a source used by the wireless device to determine a location of the wireless device and determining whether the wireless device is indoors, semi-indoors, or outdoors based on the identification of the location information source.

18. The method of claim 17, wherein the identification of the location information source identifies a global navigation satellite system, GNSS, source and wherein the wireless device is determined to be outdoors based on identification of the GNSS source.

19. The method of claim 17, wherein the identification of the location information source identifies a wireless local area network, WLAN, source and/or a Bluetooth, BT, source, and wherein the wireless device is determined to be indoors based on identification of the WLAN source and/or the BT source.

20. The method of claim 1, wherein the obtaining information further comprises:
receiving through a wireless transceiver an inertial measurement from an inertial sensor of the wireless device, and
determining, based on the inertial measurement, whether the wireless device is indoors, semi-indoors, or outdoors.

* * * * *